(12) United States Patent
Huang et al.

(10) Patent No.: US 7,757,544 B2
(45) Date of Patent: Jul. 20, 2010

(54) METHOD AND APPARATUS FOR MEASURING ELECTRICAL PROPERTIES IN TORSIONAL RESONANCE MODE

(75) Inventors: Lin Huang, Goleta, CA (US); Chanmin Su, Ventura, CA (US)

(73) Assignee: Veeco Instruments Inc., Plainview, NY (US)

( * ) Notice: Subject to any disclaimer, the term of this patent is extended or adjusted under 35 U.S.C. 154(b) by 509 days.

(21) Appl. No.: 11/619,097

(22) Filed: Jan. 2, 2007

(65) Prior Publication Data

US 2007/0163335 A1    Jul. 19, 2007

(51) Int. Cl.
*G01B 5/28* (2006.01)
(52) U.S. Cl. ......................................................... 73/105
(58) Field of Classification Search ........................ None
See application file for complete search history.

(56) References Cited

U.S. PATENT DOCUMENTS

| | | | |
|---|---|---|---|
| 5,066,858 A * | 11/1991 | Elings et al. ................. 250/307 |
| 5,144,128 A * | 9/1992 | Hasegawa et al. ........... 250/306 |
| 5,266,801 A | 11/1993 | Elings et al. |
| RE34,489 E | 12/1993 | Hansma et al. |
| 5,267,471 A | 12/1993 | Abraham et al. |
| 5,347,854 A | 9/1994 | Martin et al. |
| 5,386,720 A | 2/1995 | Toda et al. |
| 5,412,980 A | 5/1995 | Elings et al. |
| 5,481,522 A * | 1/1996 | Oguchi et al. ............ 369/59.12 |
| 5,503,010 A | 4/1996 | Yamanaka |
| 5,646,339 A | 7/1997 | Bayer et al. |
| 5,793,040 A * | 8/1998 | Oguchi et al. ................ 250/306 |
| 5,804,709 A | 9/1998 | Bourgoin et al. |
| 6,000,280 A | 12/1999 | Miller et al. |
| 6,006,593 A | 12/1999 | Yamanaka |
| 6,100,524 A | 8/2000 | Yagi et al. |
| 6,172,506 B1 | 1/2001 | Adderton et al. |
| 6,489,776 B1 * | 12/2002 | Stowe et al. ................. 324/458 |
| 6,552,339 B1 | 4/2003 | Gupta et al. |
| 6,552,556 B1 * | 4/2003 | Miki .......................... 324/754 |
| 6,590,208 B2 | 7/2003 | Massie |

(Continued)

FOREIGN PATENT DOCUMENTS

JP        08-5643    *    1/1996

(Continued)

OTHER PUBLICATIONS

Takahashi and Saida, *Magnetic Filed Detection for Current Evaluation by Magnetic Force Microscopy*, Ultramicroscopy, Aug. 2004, pp. 293-299, vol. 100, No. 3-4, Elsevier Netherlands.

(Continued)

*Primary Examiner*—Robert R Raevis
(74) *Attorney, Agent, or Firm*—Boyle Fredrickson, S.C.

(57) ABSTRACT

The preferred embodiments are directed to a method and apparatus of operating a scanning probe microscope (SPM) including oscillating a probe of the SPM at a torsional resonance of the probe, and generally simultaneously measuring an electrical property, e.g., a current, capacitance, impedance, etc., between a probe of the SPM and a sample at a separation controlled by the torsional resonance mode. Preferably, the measuring step is performed while using torsional resonance feedback to maintain a set-point of SPM operation.

17 Claims, 15 Drawing Sheets

U.S. PATENT DOCUMENTS

| | | |
|---|---|---|
| 6,694,817 B2 | 2/2004 | Degertekin et al. |
| 6,945,099 B1 | 9/2005 | Su et al. |
| 7,168,301 B2 | 1/2007 | Su et al. |
| 2002/0121131 A1 | 9/2002 | Mancevski et al. |
| 2006/0236757 A1* | 10/2006 | Sahin et al. ............ 73/105 |

FOREIGN PATENT DOCUMENTS

| | | | |
|---|---|---|---|
| JP | 2004020516 | * | 1/2004 |
| WO | WO 96/24819 | | 8/1996 |
| WO | WO 2004/005845 | | 1/2004 |

OTHER PUBLICATIONS

Kawagishi et al., *Mapping of Lateral Vibration of the Tip in Atomic Force Microscopy at the Torsional Resonance of the Cantilever*, Ultramicroscopy, May 2002, pp. 37-48, vol. 91, No. 1-4, Netherlands.

* cited by examiner

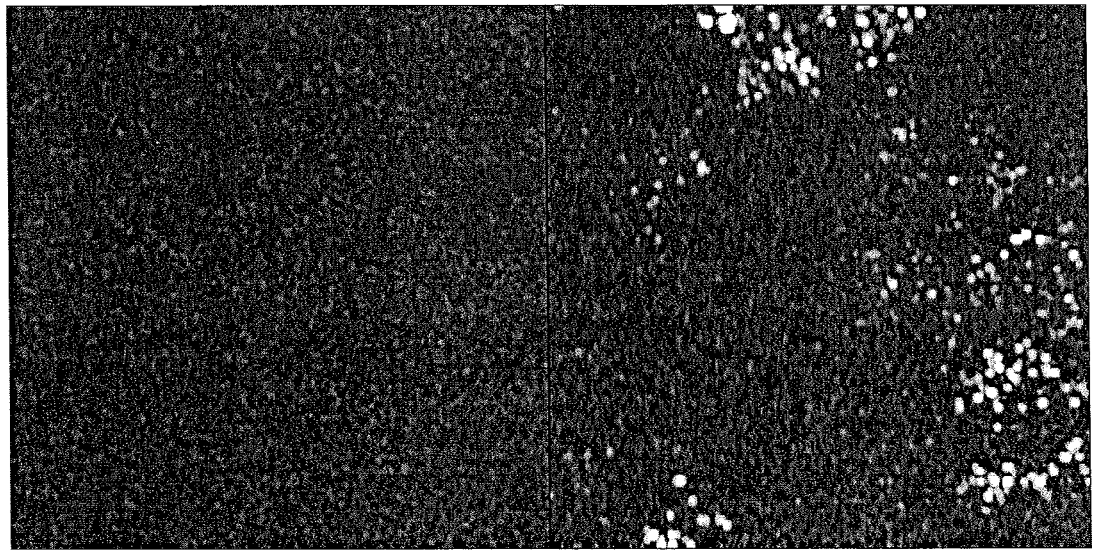
FIG. 14A                    FIG. 14B
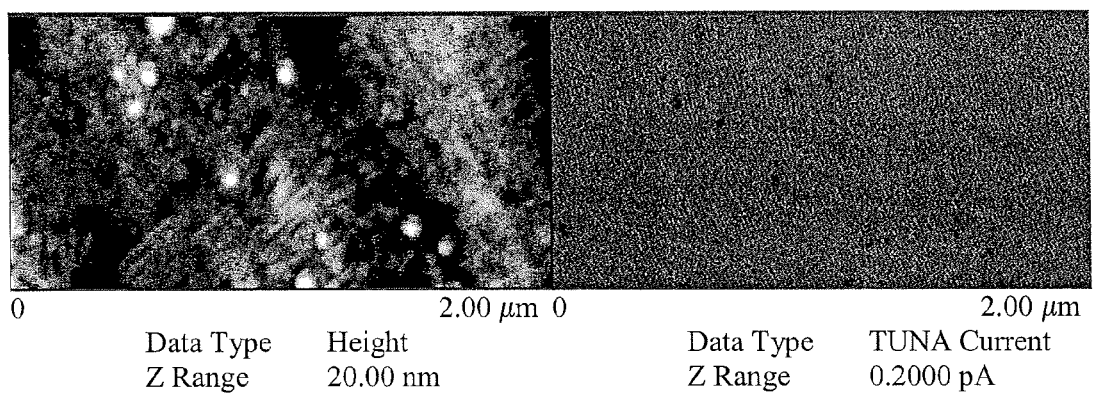
0                    2.00 µm  0                    2.00 µm
Data Type  Height          Data Type  TUNA Current
Z Range    20.00 nm        Z Range    0.2000 pA
FIG. 15A                    FIG. 15B

| 0 | 8.00 μm | 0 | 8.00 μm |
| Data Type | Height | Data Type | TUNA Current |
| Z Range | 150.00 nm | Z Range | 10.000 pA |

| 0 | 1.00 μm | 0 | 1.00 μm |
| Data Type | Height | Data Type | TUNA Current |
| Z Range | 50.00 nm | Z Range | 50.00 pA |

TR Height SCM

TR-SCM Contact-SCM

METHOD AND APPARATUS FOR MEASURING ELECTRICAL PROPERTIES IN TORSIONAL RESONANCE MODE

CROSS REFERENCE TO RELATED APPLICATIONS

This application is a non-provisional application claiming priority to U.S. patent application Ser. No. 11/133,802 filed on May 21, 2005, now U.S. Pat. No. 7,155,964, which is a provisional conversion of provisional application No. 60/573,464 filed May 21, 2004, and is a continuation-in-part of U.S. patent application Ser. No. 10/189,108 filed on Jul. 2, 2002, now U.S. Pat. No. 6,945,099, and Ser. No. 10/937,597 filed on Sep. 9, 2004 now U.S. Pat. No. 7,168,301, the entirety of each of which is expressly incorporated by reference herein.

BACKGROUND OF THE INVENTION

1. Field of the Invention

The present invention is directed to operating a probe-based instrument in torsional resonance mode, and more particularly, a method and apparatus of performing electrical property measurements using torsional resonance feedback.

2. Description of Related Art

Several probe-based instruments monitor the interaction between a cantilever-based probe and a sample to obtain information concerning one or more characteristics of the sample. Scanning probe microscopes (SPMs), such as the atomic force microscope (AFM), are devices which typically use a sharp tip to make a local measurement of one or more properties of a sample. More particularly, SPMs typically characterize the surfaces of such small-scale sample features by monitoring the interaction between the sample and the tip of the associated probe assembly. By providing relative scanning movement between the tip and the sample, surface characteristic data and other sample-dependent data can be acquired over a particular region of the sample, and a corresponding map of the sample can be generated. Note that "SPM" and the acronyms for the specific types of SPMs, may be used herein to refer to either the microscope apparatus, or the associated technique, e.g., "scanning probe microscopy."

The atomic force microscope is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc.

Preferably, the probe is scanned over a surface using a high-resolution three axis scanner acting on the sample support and/or the probe. The instrument is thus capable of creating relative motion between the probe and the sample while measuring the topography or some other property of the sample as described, for example, in Hansma et al. supra; Elings et al. U.S. Pat. No. 5,226,801; and Elings et al. U.S. Pat. No. 5,412,980.

AFMs can be designed to operate in a variety of modes, including contact mode and oscillating flexural mode. In contact mode operation, the microscope typically scans the tip across the surface of the sample while keeping the force of the tip on the surface of the sample generally constant by maintaining constant deflection of the cantilever. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography.

Alternatively, some AFMs can at least selectively operate in an oscillation "flexural mode" of operation in which the cantilever oscillates generally about a fixed end. One popular flexure mode of operation is the so-called TappingMode™ AFM operation (TappingMode™ is a trademark of the present assignee). In a TappingMode™ AFM, the tip is oscillated flexurally at or near a resonant frequency of the cantilever of the probe. When the tip is in intermittent or proximate contact with the sample surface, the oscillation amplitude is determined by tip/surface interactions. The amplitude or phase of this oscillation is kept constant during scanning using feedback signals, which are generated in response to tip-sample interaction. As in contact mode, these feedback signals are then collected, stored, and used as data to characterize the sample.

Independent of their mode of operation, AFMs can obtain resolution down to the atomic level on a wide variety of insulating or conductive surfaces in air, liquid or vacuum by using piezoelectric scanners, optical lever deflection detectors, and very small cantilevers typically fabricated using photolithographic techniques. Because of their resolution and versatility, AFMs are important measurement devices in many diverse fields ranging from semiconductor manufacturing to biological research.

In the field of nanoscience and nanotechnology, it is extremely important to measure the electrical properties of various kinds of samples on the nanometer scale. Several techniques have been developed for this task. Among these techniques, scanning tunneling microscopy (STM), conductive AFM and scanning capacitance microscopy (SCM) are widely used. In STM, the sharp metal probe described above is brought close to a surface to be scanned, with a bias voltage applied between the tip and the surface. As known from quantum mechanics, there is some finite probability that electrons will tunnel through the insulating gap between the tip and the sample when the potential between the two is different, and the separation is small. This tunneling current is measured, and a feedback system changes the tip-surface distance to maintain a constant current at a set point as the tip is scanned across the sample. STM can be used to measure properties of metals, semiconductor and other materials with high to medium conductivities.

Notably, STM has a significant drawback. Since it uses the tunneling current as the feedback signal, the sample area being scanned needs to have some conductivity to allow the feedback loop to work throughout the scan. In general, STM cannot be used to scan an insulating sample or a conductive with insulating surface layers such as oxide. To overcome this problem, one known atomic force microscope, described in U.S. Pat. No. 5,874,734, uses a conductive probe with a sharp tip on a lever arm which is brought into contact with the surface of a sample to be scanned. The force of contact between the tip and the sample is measured by the deflection of the lever arm, with the feedback system moving the tip, or alternatively, the sample, up and down to maintain a constant force between the two during relative scanning motion produced by the AFM. During scanning, a constant or variable bias voltage may be applied between the tip and sample and the current distribution may be measured, preferably simultaneously.

The advantage of this technique is using the deflection force between probe and surface as the feedback signal to control the tip surface distance and force. The technique works on insulating samples with conductive patches and ultra-low conductivity samples. However, one drawback of this technique is that it uses the previously described contact mode of AFM operation, according to which a static vertical deflection force is utilized as the feedback signal to control the force, and thus the tip-surface distance, during scanning. There are several problems associated with this. First, the feedback can only maintain a constant force between the tip and the surface in the vertical direction. When the tip scans across the surface, there is generally a large shear force present, and this high lateral force can easily damage both the tip and the sample. Moreover, to run the microscope under stable imaging conditions, the tip and sample surface must remain in mechanical contact. This is a problem not only because of the high shear forces present in contact mode, but also because the measurement is useless if the tip and sample are not in contact. This issue has seriously limited the use of AFM-based electrical characterization techniques on soft samples like conductive polymers.

Next, the sensitivity of contact mode is limited because feedback is based on a static signal, as opposed to a dynamic signal. Static signals are more susceptible to thermal drift and charging, and thus sensitivity is compromised, as described in more detail below. For these reasons, contact mode is also not preferred when imaging soft and delicate samples.

These problems with contact mode operation led to the development of the previously described oscillating mode of AFM operation, see, e.g., U.S. Pat. No. 5,519,212. Again, in oscillating mode, a cantilever with a tip is driven to resonance at its flexural resonance frequency. The amplitude of the cantilever's flexural oscillations (between 20 nm and 100 nm) and the deflection angle of the cantilever (<100 nm) are detected by a quadrant photodetector, which outputs a voltage proportional to these two values. As the tip approaches a sample surface, the flexural oscillation (tapping) amplitude starts to decrease due to confinement of the surfaces of the tip and the sample. The flexural oscillation amplitude decreases to zero as the cantilever is lowered to the surface and therefore pushes the tip against the sample surface with an increasing contact pressure. Variation of amplitude between zero (contact) and free oscillation is used to control tip surface distance and force. Properties of the sample surface such a topography, hardness and electromagnetic properties can be acquired by raster scanning the tip over the sample surface, or vice versa, and controlling the tip/surface distance using the detected flexural oscillation amplitude.

Notably, in this regard, this oscillating mode feedback used to control tip-sample separation comprises dynamic signals. This is in contrast to contact mode which employs static signal feedback that reflects the absolute value of the acquired signal indicative of the motion of the cantilever at a certain point. With no reference, static signal feedback is susceptible to thermal drift and electrostatic charging, creating significant problems given that these phenomena directly affect the sensitivity of the measurement, as understood in the art. Active signals, on the other hand, reflect a relative shift in the acquired signals. By considering relative changes, dynamic signals are less affected by thermal drift and electrostatic charging. As a result, techniques that operate based on active signals are generally much more sensitive than those that rely on static signals, providing a significant advantage to oscillating mode.

Oscillating mode, as a dynamic measurement, benefits from a high "Q" value of the corresponding cantilever in air. The Q factor of a resonating cantilever is the width of the frequency response of the cantilever at half its maximum amplitude, divided by the resonance frequency of the cantilever. Notably, a higher Q factor in cantilever oscillation improves the signal-to-noise ratio in measurements that rely on variations in the amplitude and phase of cantilevers. The Q factor also reduces the effective force applied by the tip to the sample. As a result, TappingMode imaging is typically performed at much lower forces than contact mode, allowing routine imaging of much softer samples. Finally, in oscillating mode, the tip-surface contact time is a small fraction of the oscillation cycle, so the interaction force is mainly vertical and the shear force is dramatically reduced.

However, in oscillating mode, the cantilever resonant frequencies are generally greater than 10 kHz. Amplifiers sensitive enough to measure currents in the 60 fA range, which is of particular interest in the present case, are limited to bandwidths well below 1 kHz. Further, in oscillating mode as noted previously, the tip is in contact with the surface for a small fraction (for example 1%) of the oscillation cycle. Although this is a benefit for minimizing shear force, and thus sample damage, such minimal contact is a drawback in that the tip moves in and out of what is known as the "near field." Because the tip of the probe must be in the near field to measure many electrical properties of the sample this often is a significant drawback with using oscillating mode to perform electrical measurements. Overall, for these reasons, it is generally not possible to perform low current measurements on samples while operating in oscillation feedback mode.

Therefore, one is most often left with operating the AFM in contact mode to perform these types of electrical measurements. As noted previously, in contact mode, there always must be mechanical contact between the tip and the sample surface, and thus a minimal force must always be applied. In fact, the tip must be caused to penetrate a water layer that resides on the sample surface and then to push into the sample surface; otherwise, stable imaging cannot be achieved. Therefore, a "soft" cantilever, i.e., one having a low spring constant, is typically employed in contact mode so as to minimize the magnitude of the forces applied to the sample surface, and thus minimize damage to the sample. In some cases, stiffer cantilevers are used to break through surface oxides and contaminants to make sound electrical contact.

Contact mode cantilevers often suffer from a serious drawback in that they cannot be brought into close proximity to the sample surface without the tip snapping into contact with the surface. This is due to the water layer on the sample surface that produces a meniscus force that acts on the lever as the tip approaches the sample surface. This is particularly a problem when performing force spectroscopy measurements, an illustration of which is discussed in connection with FIGS. 1-3.

When performing a spectroscopy or force measurement, probe-sample separation is controlled at a single scan location, i.e., X-Y location, as the deflection of the cantilever is monitored with an optical deflection detection scheme, for example. Typically, the tip is brought into contact with the sample surface at a certain speed and then withdrawn from the surface. As shown in FIG. 1, when a tip 22 of a probe 20 is brought towards a sample surface 24 (either by moving the sample towards a generally fixed probe, or moving the probe toward a generally fixed sample), the tip is "snapped" into contact with the sample surface from a relatively large separation distance, marked "A."

This outcome is illustrated graphically in FIGS. 2 and 3 showing plots of distance (i.e., probe-sample separation) versus deflection. Initially, moving from right to left as shown by the arrows, the tip snaps to contact with the sample surface at about the point marked "P" as probe-sample separation is reduced. As a result, deflection of the probe downwardly increases. This snap-to-contact is illustrated more clearly in FIG. 3 at the region marked P showing (with the vertical portion of the graph) the cantilever instantly deflected downwardly as it is pulled by the meniscus force, and driving the tip into contact with the sample surface. The probe then deflects upwardly as the probe-sample separation is further decreased. Upon withdrawal of the probe from the sample surface in this spectroscopic measurement, the tip typically will adhere to the sample surface, again causing the cantilever to deflect downwardly until the point marked "Q" is reached, at which point the tip releases from the sample surface. This action between the probe and the sample yields regions of instability in the tip-sample separation continuum where the AFM cannot "hold" the tip to perform a current measurement. As such, in these regions, defined at $I_1$ and $I_2$, sample properties are generally "invisible" to the user.

The field of electrical property measurement was therefore in need of a system that enables nanometer scale measurement of ultra-low currents, for example (60 fA to 120 pA), correlated with topography on soft and delicate materials, and to acquire STM-type tunneling current data without relying on current as the feedback mechanism. The ideal solution would reduce tip wear and increase throughput for measurements of thickness and electrical properties of dielectric and insulating films. Preferably, the system would enable stable and localized measurements of I/V curves both in contact with the surface and with a small (i.e., nanometer scale) vertical offset from the surface. A system that allows the probe tip to remain in the near field (preferably, within a couple of nanometers of tip-sample separation), yet ensures that the probe does not snap into contact with the sample surface, would be ideal.

SUMMARY OF THE INVENTION

The preferred embodiments overcome the above-noted drawbacks by providing an atomic force microscopy apparatus and method that characterizes electrical properties of samples that consist of both conductive and non-conductive regions on the nanometer scale. Local electrical properties that can be measured by this technique include, but are not limited to: voltage, current, conductivity, resistivity, conduction current, tunneling current, dI/dV, dI/dz, surface potential, work function, capacitance, dC/dV, dC/dz, dielectric constant, dopant density, impedance, barrier height, and induced photovoltage. All of these are examples of localized electrical measurements that can be made by SPM. The system and method provide direct correlation of the location on a sample surface with its electrical properties by simultaneously mapping the topography and electrical current obtained when a bias is applied between the tip and the sample. In particular, the preferred embodiments enable nanometer scale measurement using ultra-low currents (60 fA to 120 pA) on very soft and delicate materials. In the preferred embodiments, TR mode is employed whereby the amplitude of the torsional resonance of the probe is used to control the probe so that it remains in close proximity to the sample surface, thus allowing precise measurement of the current between the tip and surface, at narrow (i.e., nanometer scale) tip-sample separations, during data acquisition. Alternatively, the probe may be oscillated at a lateral resonance.

According to a first aspect of the preferred embodiment, a method of operating a scanning probe microscope (SPM) includes the steps of oscillating a probe of the SPM at a resonance of the probe, the resonance being at least one of a torsional resonance and a lateral resonance, and measuring an electrical current between a probe of the SPM and a sample. Preferably, in addition, the measuring step is performed while using torsional/lateral resonance feedback to maintain a setpoint of SPM operation.

In another aspect of this embodiment, the sample is one of a group including a conducting polymer, an organic LED, a biomolecule, a carbon nanotube, a nanowire, a semiconductor, and a biological cell.

In a further aspect of this embodiment, the set-point is indicative of a separation between a tip of the probe and a surface of the sample. Preferably, the separation is less than 10 nm. More preferably, the separation is between about 1 and 5 nm.

According to another aspect of this embodiment, the electrical property is an electrical current, and the measuring step includes using a pA-amplifier to generate a current output signal.

In a still further aspect of this embodiment, the probe is conductive and a DC bias voltage is applied between the probe and the sample.

According to yet another aspect of this embodiment, the probe is sufficiently stiff to maintain a tip-sample separation of between about 1 nm and 5 nm during operation. Preferably, the probe has a spring constant between about 1 and 40 N/m.

According to a further aspect of this embodiment, the probe is a self-actuated probe having a cantilever including an active element. Preferably, the self-actuated probe includes a piezoelectric drive actuator disposed on a backside of a cantilever of the self-actuated probe.

According to another aspect of this embodiment, the method further includes applying a DC bias voltage between the tip of the probe and a surface of the sample so as to generate a current between the tip and the surface. Preferably, the current is less than 500 pA. More preferably, the current is between about 60 fA and 120 pA.

According to a still further aspect of this embodiment, the electrical property is a capacitance and is indicative of an SCM measurement. Notably, the method also preferably includes simultaneously measuring topography of the sample.

In another embodiment, a method of operating a scanning probe microscope includes measuring an electrical property of a sample using a probe, and maintaining a force between the probe and the sample at an amount generally less than 50 nN. Preferably, the force is maintained at less than 25 nN, and ideally is kept to about 1 nN, sometimes even in the attractive force region (2~3 nN).

In a still further embodiment, a method of operating a scanning probe microscope (SPM) includes measuring an electrical property of a sample with a probe. Notably, the sample can have an elastic modulus of generally less than 1 GPa. Even so, the measuring step is performed without plastic deformation of the sample.

In another preferred embodiment, a method of performing an electrical property measurement using a scanning probe microscope (SPM) having at least one cantilever includes oscillating the cantilever at or near at least one of a torsional resonance and a lateral resonance. In addition, the method includes measuring a property of the oscillating cantilever, and adjusting the probe-sample separation as a result of the measuring the property step. In this case, the method measures a current between the sample and the probe, wherein a tip of the probe is separated from a surface of the sample by about 0 nm to 5 nm.

In yet another aspect of the preferred embodiment, an apparatus for measuring a sample includes a probe holder supporting a probe. In addition, the apparatus includes a torsional resonance mode actuator that couples energy to the probe to oscillate the probe at a torsional resonance thereof, and a conductor in electrical communication with said probe. Finally, an electrical property detector is provided to measure an electrical property of the sample when disposed between said probe and said conductor. Preferably, the probe holder is shielded.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 14A and 14B are images showing topography and current distribution with a positive bias, respectively, using torsional resonance mode when imaging a thermal plastic polymer filled with carbon black;

FIGS. 15A and 15B are images depicting topography and current distribution with a negative bias, respectively, using torsional resonance mode;

DETAILED DESCRIPTION OF THE PREFERRED EMBODIMENT

Figure 1:
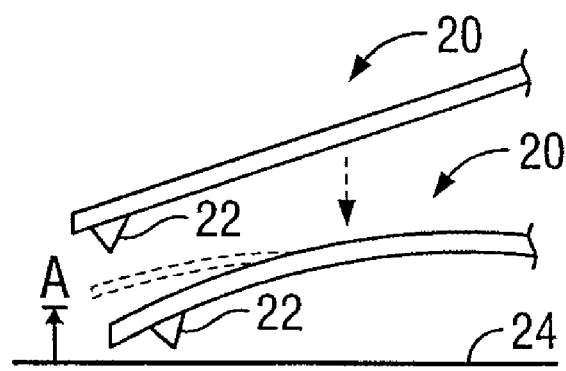
FIG. 1 is a partially broken away side elevational view of the probe brought into contact with a sample surface.
Figure 2:
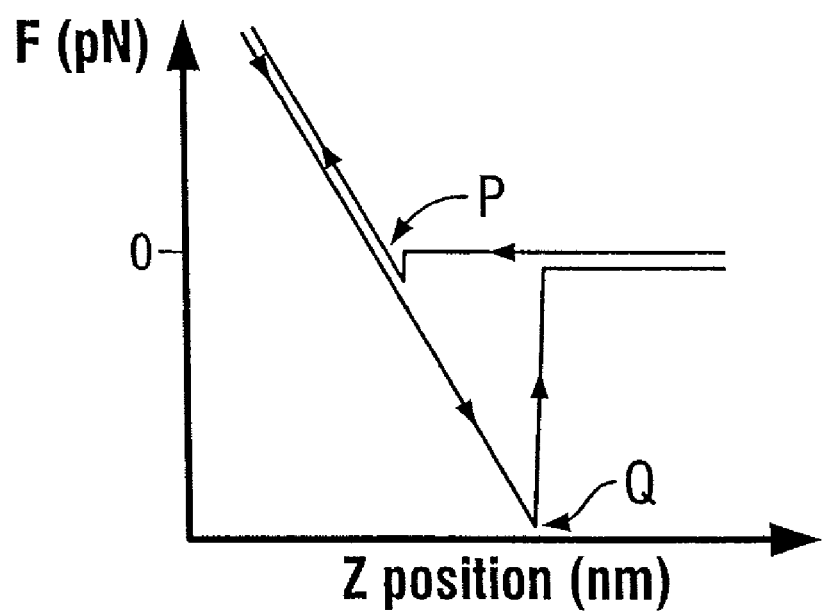
FIG. 2 is a graph showing a force curve generated by an AFM using a "soft" cantilever.

The preferred embodiments take advantage of the benefits provided by a new mode of AFM operation being developed known as torsional resonance mode ("TR mode), shown and described for instance in U.S. Ser. Nos. 10/189,108 and 10/937,597 to the present assignee. This technique includes driving a cantilever probe at its torsional resonance frequency and using the amplitude of oscillation at resonance for feedback control to keep the tip in proximity to the sample surface. As with other modes of AFM operation, these feedback signals are indicative of a characteristic of a sample, such as sample topography, and can be used to generate a map of the surface. In TR mode, the torsional resonance of the lever and changes thereto are measured by a four-quadrant photo detector. More particularly, the detector differentiates both vertical and horizontal components of probe motion, indicative of, cantilever flexural and torsional motion, respectively.

The damping of the RMS amplitude of the detected torsional signal is used as the measure of tip surface interaction when the probe is brought into the proximity of the sample surface. A feedback loop is used to adjust the tip-sample separation based on a measurement of the torsional oscillation. For example, the feedback loop can adjust the tip-sample separation in response to the amplitude, phase, frequency or other measure of the torsional resonance. The feedback loop can move either the tip, the sample or both to adjust the tip-sample separation. Ideally the feedback loop is optimized to keep the tip-sample separation substantially constant, although some variation in this separation inevitably occurs. The feedback loop may be analog, digital, or a hybrid of both. The feedback loop may use a simple PI (proportional/integral) algorithm, or may use any type of more complex control schemes, including model-based controllers H2 or H-infinity control. Control theory textbooks contain many such candidate control algorithms.

In contrast to flexural oscillating mode (Tapping Mode), however, the tip is kept in close proximity to the surface for the entire oscillation (duty) cycle. This makes it possible to apply a bias between the tip and the sample and measure the resulting current passing through the tip while simultaneously mapping the topography of the surface. Such measurements could previously only be done, with significant drawbacks, in contact mode, in which the large associated shear forces typically damage delicate samples, thus making obtaining reasonable data of such samples basically impossible. Moreover, by using TR mode, rather than contact mode, a cantilever having a significantly greater stiffness (i.e., spring constant) can be used, and thus the probe can be positioned to measure electrical parameters accurately in the near field without the snap-to-contact problem associated with "soft" cantilevers used in contact mode, as described above in the Background.

In TR Mode imaging, the cantilever can be positioned such that it is being pulled downwardly by the attractive forces in the vertical direction between the tip and sample. In contrast to the repulsive force contact mode, the small attractive forces in TR Mode can typically be optimized to not damage the tip or sample. Also, TR Mode is an oscillating mode of operation, and as such is a dynamic measurement. Therefore, TR Mode benefits from a high "Q" value of the corresponding cantilever in air. Again, a higher Q factor in cantilever oscillation improves the signal-to-noise ratio in measurements that rely on variations in the amplitude and phase of the cantilever of the probe. As a result, for this additional reason, the sensitivity of measurements when operating in TR Mode is higher than when operating in contact mode.

Because of the high Q oscillation and the reduced normal force, the lateral forces between the tip and sample are much smaller than the static shear forces. In this case, the energy dissipation in TR Mode can be the surface dilation (i.e., elastic deformation of the surface). Therefore, TR Mode can image soft and delicate samples, similar to TappingMode, but keep the tip in the near field of the surface all the time. As such, it is possible to use torsional mode to keep the tip at a constant height at a particular sample area, then ramp the bias between the tip and sample to obtain local force spectroscopy information, similar to both contact current-voltage curves and the current-voltage curves that are obtained in scanning tunneling microscopy, often referred to as scanning tunneling spectroscopy (STS).

Another problem resolved by the preferred embodiments relates to one of the drawbacks of STM described previously. In STM, the entire sample surface must be conductive since the topographic feedback relies on the tunneling current between the tip and the sample in order for the tip to remain on the surface. By using the torsional resonance amplitude for topographic feedback, the tip can be maintained at a position slightly above the surface (fractions of a nanometer to nanometer range), out of mechanical contact with the sample, and acquire STM-type tunneling data without relying on keeping a continuous current in order to maintain the topographic feedback loop. Of course, as mentioned immediately above, this is possible also because a cantilever having a greater stiffness than a typical contact mode cantilever is employed, i.e., small tip-surface separations can be maintained without the tip snapping into contact with the sample surface.

Figure 4:
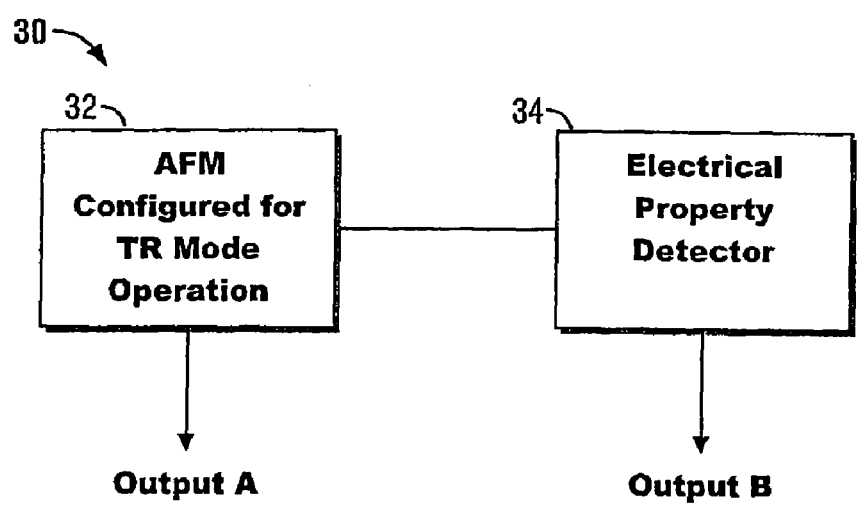
FIG. 4 is a block diagram of a preferred embodiment of an AFM for measuring electrical properties of a sample in torsional resonance mode.

Turning to FIG. 4, an instrument 30 for measuring small scale current and topography of a sample includes an AFM 32 coupled to an electrical property detector 34. As described in further detail below, AFM 32 includes a probe that is oscillated at its torsional resonance and a detector that senses changes in the torsional oscillation of the probe. AFM 32 uses these changes to generate control signals to maintain AFM operation at a set-point. These control signals, shown generally as "Output A" in FIG. 4, are indicative of a sample characteristic such as topography. Electrical property detector 34, also described in further detail below, can measure one or more properties of the sample and/or the tip-sample junction, for example, the current flowing between the tip of the probe of AFM 32 and the sample and thus generate "Output B" to generate, for instance, a map of current distribution across the sample. In this way, while changes in torsional resonance provide the feedback for maintaining tip-sample separation, current measurements may be made simultaneously even if non-conductive portions of the sample are scanned. Further, as mentioned previously, spectroscopic current measurements may be made at scan locations of interest. Notably, by using TR mode feedback and relatively stiff probes, these spectroscopic measurements can be obtained.

Figure 5:
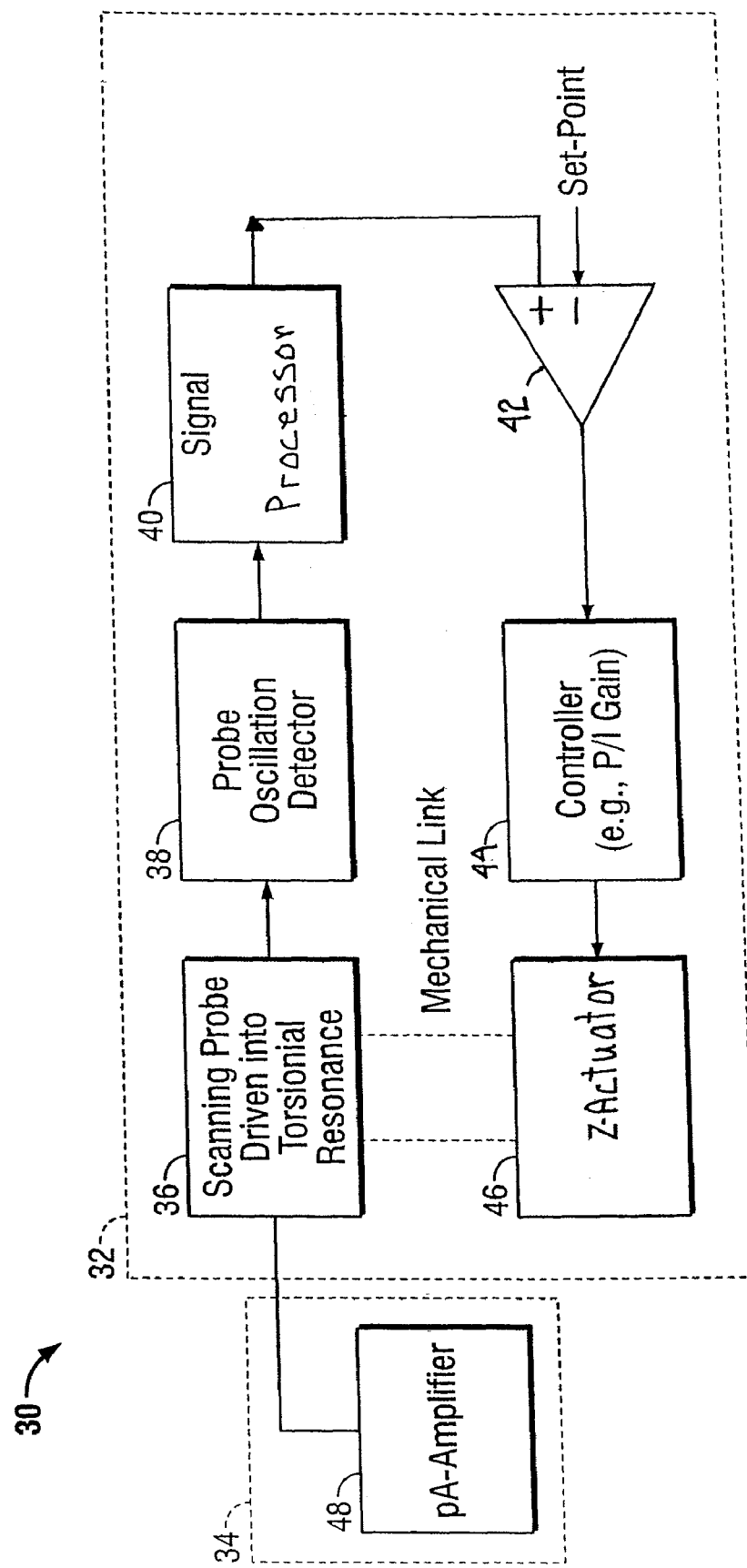
FIG. 5 is a more detailed block diagram of an AFM according to the preferred embodiment for measuring electrical characteristics of a sample in torsional resonance mode.

Turning to FIG. 5, a more detailed block diagram of system 30 is shown. Instrument 30 can detect electrical properties of a sample under test (not shown), while simultaneously controlling AFM data acquisition by detecting changes in torsional oscillation of the probe. Instrument 30 includes AFM 32 having a scanning probe 36 that is driven at its torsional resonance frequency, described below and shown and described in U.S. Ser. Nos. 10/189,108 and 10/937,597.

Deflection of the probe 36 is monitored by a detector 38, which typically is an optical detection scheme (e.g., a laser beam-bounce system using a quadrant photo-detector). Detector 38, however, can be any device for providing a measurement of the motion of the cantilever. Other examples of suitable detectors include but are not limited to optical interferometry, capacitive detection, piezoelectric, and piezoresistive detection.

The output of detector 38 is transmitted to a signal processor 40 which may be used to obtain a measure of the torsional oscillation. In the simplest implementation, the signal processor consists of hardware and/or software to measure the amplitude of torsional oscillation. Alternatively or additionally the hardware and/or software may be used to measure the phase, frequency or other parameter of the torsional oscillation. Note that this signal processor may be entirely an analog circuit, for example an RMS-to-DC converter, a lock-in amplifier, and/or a phase-locked loop. Alternately, the high frequency cantilever deflection signal can be directly sampled by a high-speed data acquisition system and the acquired signal can be demodulated using digital computation either with dedicated digital circuitry, digital signal processors, FPGAs and/or computers. In yet another alternative, a hybrid system combining any of the analog and digital components mentioned above can be used to achieve the desired signal conditioning.

Signal processor 40 operates to condition the acquired signal for comparison to a desired set-point. The set-point may be set by a user or determined automatically by the system. The set-point is typically subtracted from the output of the signal processor at error node 42. The subtraction at error node 42 can be done by analog circuitry, for example with an instrumentation amplifier or operational amplifier. Alternatively, the set-point subtraction can be done by digital electronics or inside a computer. Error node 42 outputs an error signal that is sent to a controller 44. Controller 44 outputs a signal that is used to control the motion of one or more z-actuators to adjust the tip-sample separation. Controller 44 may be implemented by analog circuitry, digital electronics (for example, a digital signal processor, a field programmable gate array, computer), or a hybrid of any of the above. The controller 44 loop may use a simple PI (proportional/integral) feedback algorithm, or may use any type of more complex control schemes, including model-based controllers H2 or H-infinity control, as mentioned above.

Controller 44 generates a control signal that generally returns the torsional resonance oscillation to the selected set-point. More particularly, the control signal is applied to an actuator 46, for moving either the probe and/or sample vertically. Note that in this case the term "vertically" is used for convenience, referring to the primary axis of separation between the probe and the sample. There is no requirement, however, that this direction be oriented in the conventional up-down direction. Actuator 46 is preferably a piezoelectric actuator that expands and contracts when a voltage is applied to it. The piezoelectric actuator may be additionally guided or constrained by flexures or other means. In addition, the actuator may be an individual element or part of a multi-axis scanner, for example an XYZ piezoelectric tube. The z-actuator may also be a balanced momentum actuator, as disclosed in U.S. Pat. Nos. 6,323,483 and 6,861,649, for example. In alternative embodiments the actuator can be an electrostrictive, electrostatic, electromagnetic, magnetic, or other devices that produce motion in response to an input signal.

Finally, instrument 30 includes an electrical property detector 34 which preferably is a low-noise pA-amplifier 48 for measuring currents between the probe and the sample in the picoamp range. Electrical property detector 34 preferably also includes an extra gain stage and a filter stage (described below) that ultimately outputs signals to an ADC (analog-to-digital converter) to enable current measurements in the desired range of about 60 fA. The electrical property detector may also be a device for measuring such properties as voltage, current, conductivity, resistivity, conduction current, tunneling current, dI/dV, dI/dz, surface potential, work function, capacitance, dielectric constant, impedance, and induced photovoltage. For example, a device for resistivity measurements applies a voltage across the tip/sample gap and measures the resulting current. For a surface potential measurement, an additional feedback loop adjusts a voltage on the tip until it substantially matches the potential on the surface. If the desired electrical property is impedance, a vector impedance meter, manufactured for example by Agilent, would be the electrical property detector 34. Additionally, this device can be an "applications module" an add-on unit for example sold by the assignee which enables specific electrical measurements. For example, the present assignee sells applications modules for scanning spreading resistance, scanning capacitance microscopy, tunneling AFM (TUNA), and four-point probe measurements. The electrical property detector 34 is shown schematically as a single box, and it may consist of just a simple electronic circuit like an amplifier. Alternately, depending on the desired measurement, it may also consist of more sophisticated electronics that may implemented in part or in full in a computer or other digital electronics. For all the electrical property measurements described above, there are numerous publications in the literature describing the details of such measurements and thus they will not be described in more detail here. The key requirement, however, is that the electrical property detector 34 measures one or more electrical properties of the sample and/or the tip-sample junction.

A review of the preferred apparatus associated with each of these blocks 32 and 34 is described immediately below. Initially, AFM operation in torsional resonance mode is discussed with respect to FIGS. 6-8, and then current detection is described in connection with FIG. 9.

Torsional Resonance Mode

A probe-based instrument, such as an AFM, that analyzes one or more characteristics of a sample in a torsional resonance mode is shown in FIGS. 6-9, and described herein. Note that, any one of a number of techniques for generating a steady torsional resonance in the cantilever of the SPM probe can be employed, together with feedback control, to image or otherwise characterize sample surfaces. During operation, a property of a torsional oscillation of the probe (e.g., amplitude, phase or frequency) is monitored to determine sample surface characteristics. Notably, the torsional signal detection is preferably implemented using configurations such as in the TR Mode capable AFMs offered by the present assignee, Veeco Instruments Inc.

Note that when the term "horizontal motion" is used herein, it is intended to refer to the motion that is produced by the torque that rotates the tip. However, because the scale of the arc that is traced out by the motion of the tip, motion is effectively only in the horizontal direction in torsional resonance mode. This motion is typically on the order of 0.3 nm to 3 nm. Also, in contrast to TappingMode in which the tip contacts the surface approximately 1% of the time during data acquisition, in TR mode the tip is kept near the surface nearly 100% of the time.

Figure 6:
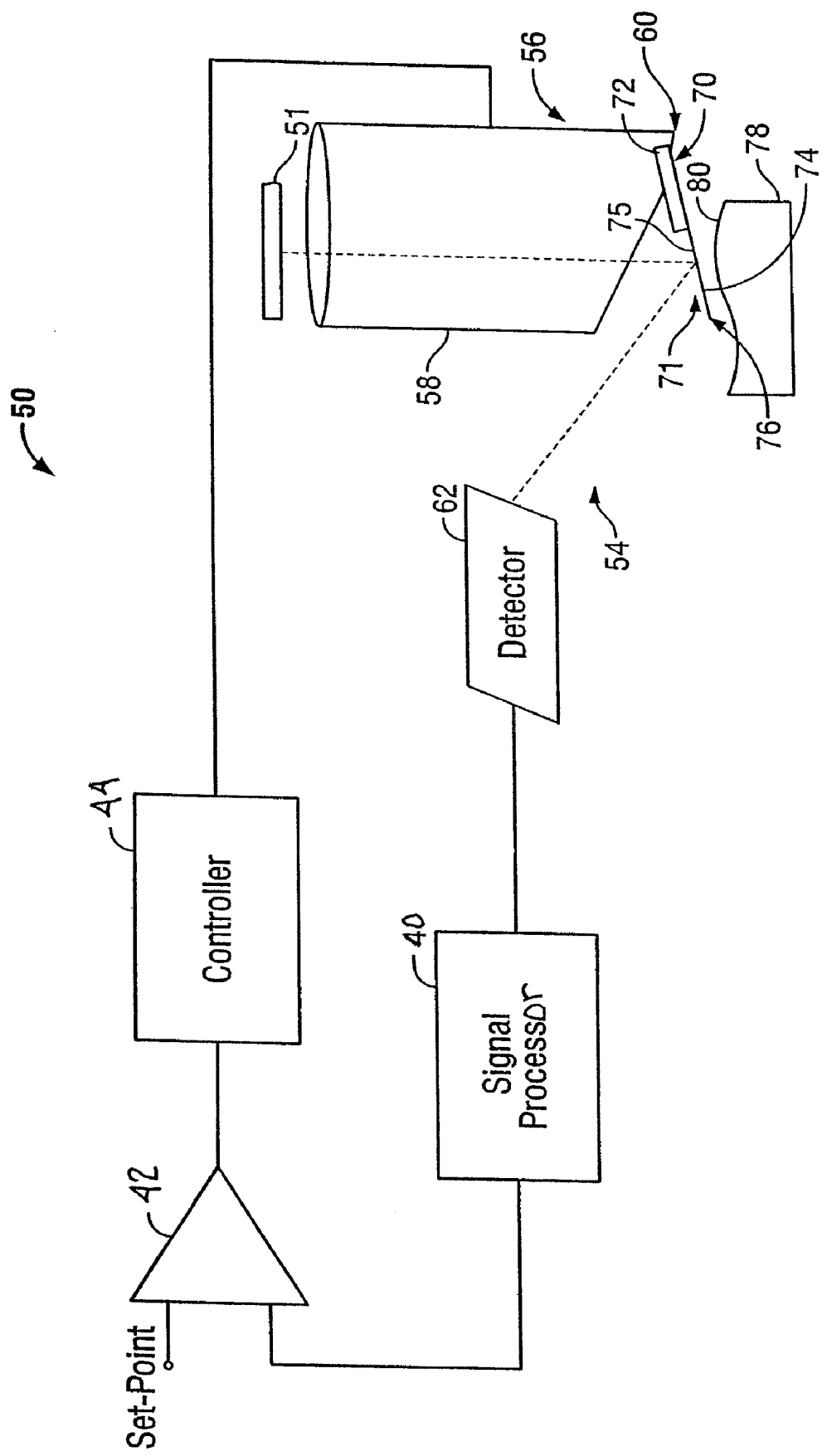
FIG. 6 is a schematic view of a torsional resonance mode scanning probe microscope.

A preferred embodiment of a torsional resonance mode atomic force microscope 50 is shown in further detail in FIG. 6. AFM 50 includes a feedback controller 44, a probe oscillation deflection detection system 54, an actuator 56, and a probe assembly 70. Probe assembly 70 includes a base 72 and a probe 71. The probe includes a cantilever 74 extending from the base 72 and a tip 76 that interacts with a surface 80 of a sample 78 during operation. Notably, probe assembly 70 also includes an actuator that is used to drive the cantilever into oscillation using the controller electronics which may include a frequency synthesizer. In the case of an active lever, a piezoelectric layer 122 operates as the actuator. Alternatively, one or more piezoelectric plates may be employed to drive the cantilever.

In this embodiment, probe assembly 70 is supported by actuator 56. Actuator 56 preferably defines an XYZ scanner 58 that may be implemented with, for example, a piezoelectric tube or piezoelectric stack that translates a free end 60, and thus probe assembly 70 coupled thereto, in three orthogonal directions. More particularly, the XY section of scanner 58 translates the probe along the sample surface 80, while the Z drive section of scanner 58 translates the probe assembly orthogonally to the sample surface, for example, in response to feedback from controller 44 during data acquisition. In alternate embodiments, the XYZ scanner may be replaced by separate elements, for example XY scanning of the sample and Z actuation of the probe or any permutation that generates relative motion between the probe and the sample.

To operate AFM 50 in torsional resonance mode, at least the tip 76, and preferably the entire cantilever motion of the probe 71 is initially driven into oscillation at or near a torsional resonance of probe 71 using any of the techniques described in U.S. Ser. Nos. 10/189,108 and 10/937,597, noted above. The separation between tip 76 and sample 78 is then reduced (e.g., by exciting actuator 58 in Z) to cause the two to interact. A beam of light "L" generated by probe oscillation detection system 54 (e.g., a laser 51), is directed towards a back 75 of cantilever 74 so that it is reflected therefrom. The reflected beam is then sensed by a detector 62. Preferably, detector 62 is a quadrant (i.e., four-cell) photodetector.

The interaction between tip 76 and sample 78 causes the reflected beam to translate laterally across detector 62. This lateral movement of the reflected light beam is indicative of one or more sample surface characteristics. More particularly, the oscillating motion of cantilever 74 is detected by the lateral cells of quadrant deflector 62 which produces a corresponding AC signal. Changes in this AC signal are indicative of surface and possibly other characteristics of the sample under study.

To quantify these characteristics, the AC signal output by detector 62 (i.e., lateral deflection signal) is transmitted to by analog and/or digital means to signal processing block 40. Signal processing block 40 outputs a signal associated with the lateral or torsional motion of the cantilever. Signal in this case refers to an analog signal, for example a voltage and/or a digital signal or data representative of the torsional motion of the cantilever. In this case, the lateral signal output by processing block 40 is then transmitted to a error node 42 that generates an error signal based on a predetermined set-point corresponding to the desired torsional oscillation. In this context, the error signal can be an analog voltage, a digital signal, and/or data inside a computer. The desired torsional oscillation may be defined in terms of the oscillation amplitude. Alternatively, the phase of the signal output by detector 62 can be analyzed and compared with an appropriate set-point phase of torsional oscillation. In this way, the phase or frequency signal can be used as the error signal of the feedback loop to control probe-sample interactions, also known as torsional resonance feedback. Rather than an RMS-to-DC converter, a lock-in amplifier or any other structure capable of performing the identified functions may be employed.

The error signal output by error node 42 is then transmitted to a controller 68 that compensates for the error by generating a control signal that returns the torsional oscillation of the probe back to the set-point value. Controller 68 may be a proportional-integral (P-I) gain stage in the feedback loop that generates and transmits a correction signal to XYZ scanner 58. In response to the correction signal, scanner 58 translates probe assembly 70 orthogonally to the surface of sample 78 (i.e., in "Z") to return the oscillation of the probe 71 to the set-point value. Notably, it is typically the control signal output by controller 68 that provides the data pertaining to the sample surface.

In addition, when relative scanning movement between probe assembly 70 and sample 78 is employed, a map of sample surface 80 may be generated by plotting the correction signals generated by the controller 68 for each scan position. Again, the X-Y components of scanner 58 are used to position tip 76 at different locations of surface 80 of sample 78 to allow generation of the map. Alternatively, torsional mode can be employed to conduct a force measurement and generate a corresponding curve. In this measurement, the tip 76 interacts with the sample 78 at different "Z" positions, and the corresponding forces are measured. One notable experiment includes using the tip 76 to "pull" on a molecule on a surface of a sample. Such force measurements (e.g., measuring local stiffness) are described in U.S. Pat. No. 5,224,376, assigned to the present assignee, and expressly incorporated herein by reference.

Figure 7:
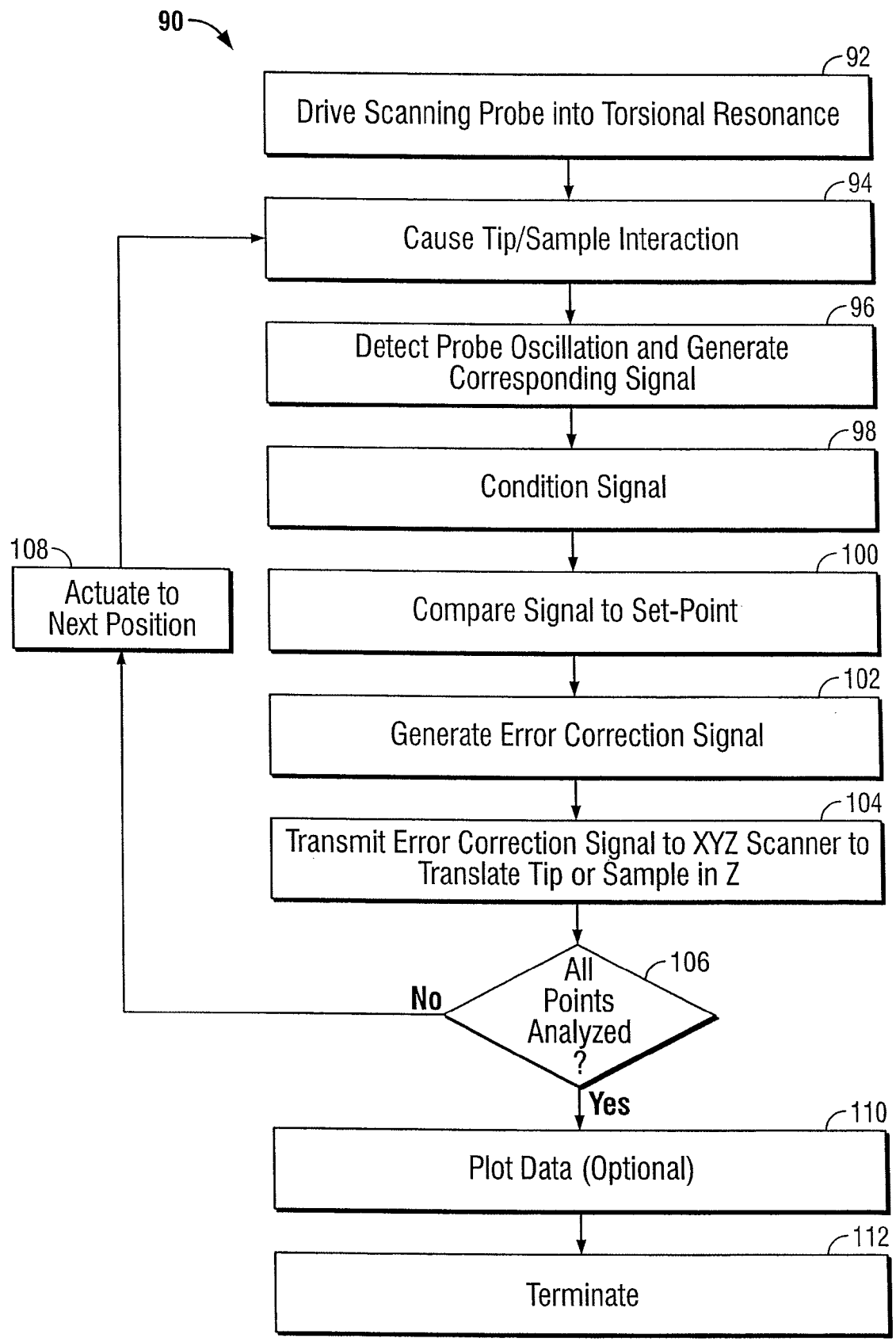
FIG. 7 is a flow chart illustrating a method of operating a scanning probe microscope in torsional resonance mode.

Turning to FIG. 7, a flow chart illustrates a method 90 of torsional mode operation using AFM 50. In Block 92, AFM 50 instigates torsional oscillation mode by appropriately driving an AFM probe 71 using any one of a number of techniques that develops torque about a central or other longitudinal axis of cantilever 74 of probe assembly 70. These techniques, and their associated apparatus, are described in U.S. Ser. No. 10/189,108, cited previously.

Next, the separation distance between the tip 76 and the sample 78 is reduced so the two begin to interact. As a result of this interaction, the torsional motion of the probe 71 changes. These changes are sensed in Block 96 as the detection system (54 in FIG. 6) monitors the motion of the probe and generates corresponding output signals. Block 98 conditions the output from the detection system. For example, method 90 may employ an RMS-to-DC converter, a lock-in amplifier, a phase-locked loop, and/or a digital computation to determine a measure of the torsional oscillation. The conditioned output (e.g., from the signal processor 40 in FIG. 6) is then compared, in Block 100, to the set-point associated with the desired oscillation of the probe. This comparison yields an error signal comprising the difference between the detected oscillation of the probe and the set-point. Once the comparison in Block 100 is complete and an error signal is generated, the error signal is transmitted to the controller (44 in FIG. 6) where the method 90 generates an error correction or control signal in Block 102. Preferably, the control signal is generated using a P-I gain stage, as described previously.

Figure 3:
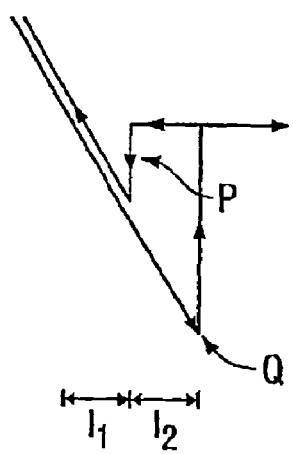
FIG. 3 is an exploded view of the graph shown in FIG. 1.

In Block 104, the control signal is transmitted to the XYZ scanner 58 of FIG. 3 to translate the tip or sample in "Z" to return the oscillation of the probe to its set-point value. Again, the set-point may either be associated with an amplitude of the torsional resonance oscillation of the cantilever, a frequency of that oscillation, or a phase of that oscillation. Then, in Block 106, method 90 determines if additional points of the sample surface are to be considered. If so, a scanner positions the tip 76 of the probe 71 at the next point on the sample surface in Block 108, and repeats the data acquisition steps. Once all points have been considered, an image may be generated using the acquired data in optional Block 110, and the method 90 terminates in Block 112.

Figure 8:
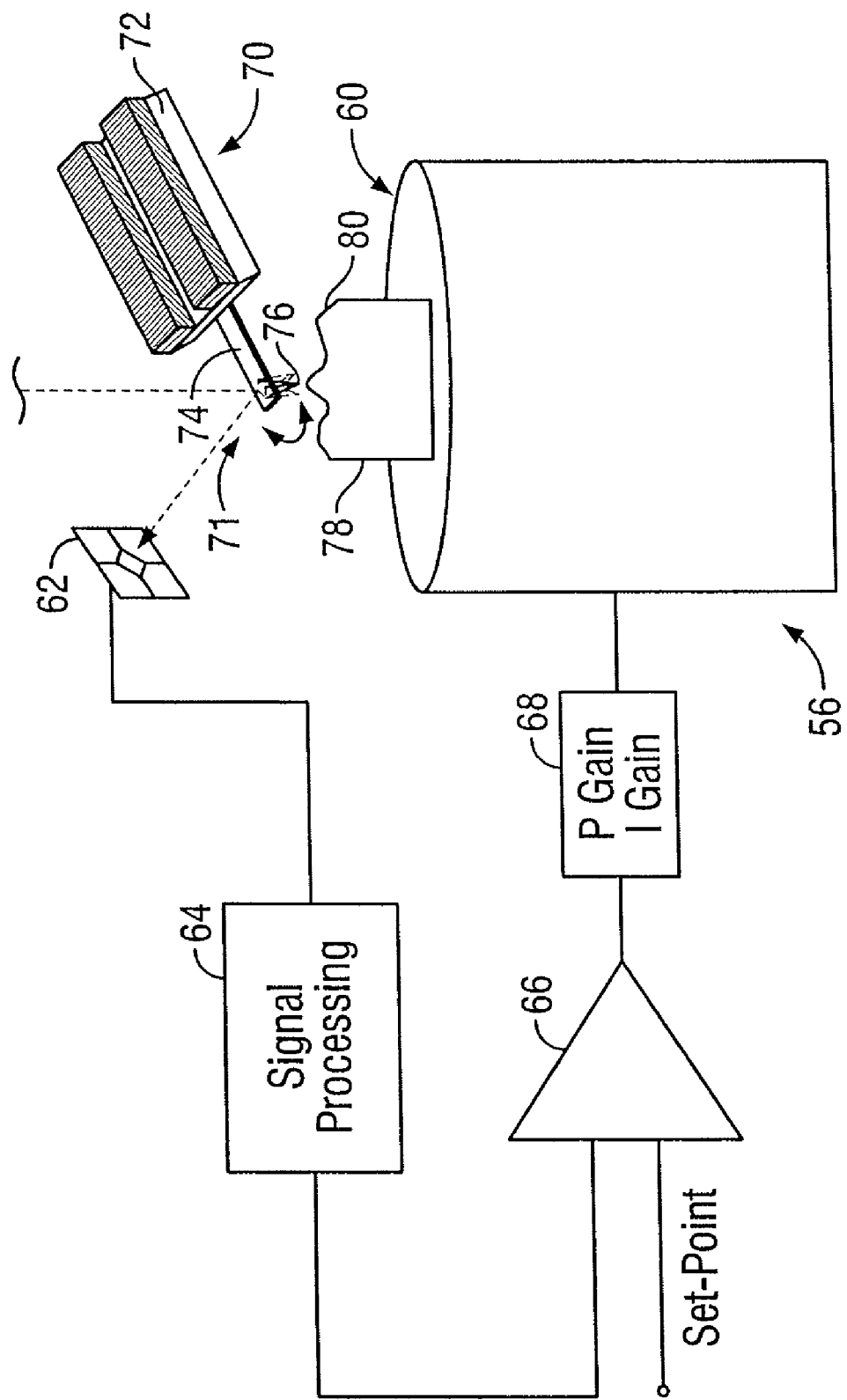
FIG. 8 is a schematic view of a torsional resonance mode scanning probe microscope similar to the microscope of FIG. 6, configured for scanned sample operation.

Turning next to FIG. 8, in an alternative arrangement, sample 78 is placed on a free end 60 of XYZ scanner 56 so that the relative position between sample 78 and probe assembly 70 can be modified by moving sample 78, rather than probe assembly 70. Such an arrangement is particularly useful in research applications, for example using the Multi-Mode™ AFM offered by the present assignee. In this case, detection system 62 senses changes in the torsional oscillation of cantilever 74, but rather than actuating the position of probe assembly 70 to maintain the set-point torsional oscillation, sample 78 is translated to maintain the set-point torsional oscillation. Of course, any combination of actuators may be implemented to provide relative movement between the sample and the probe assembly in three orthogonal directions.

Figure 20:
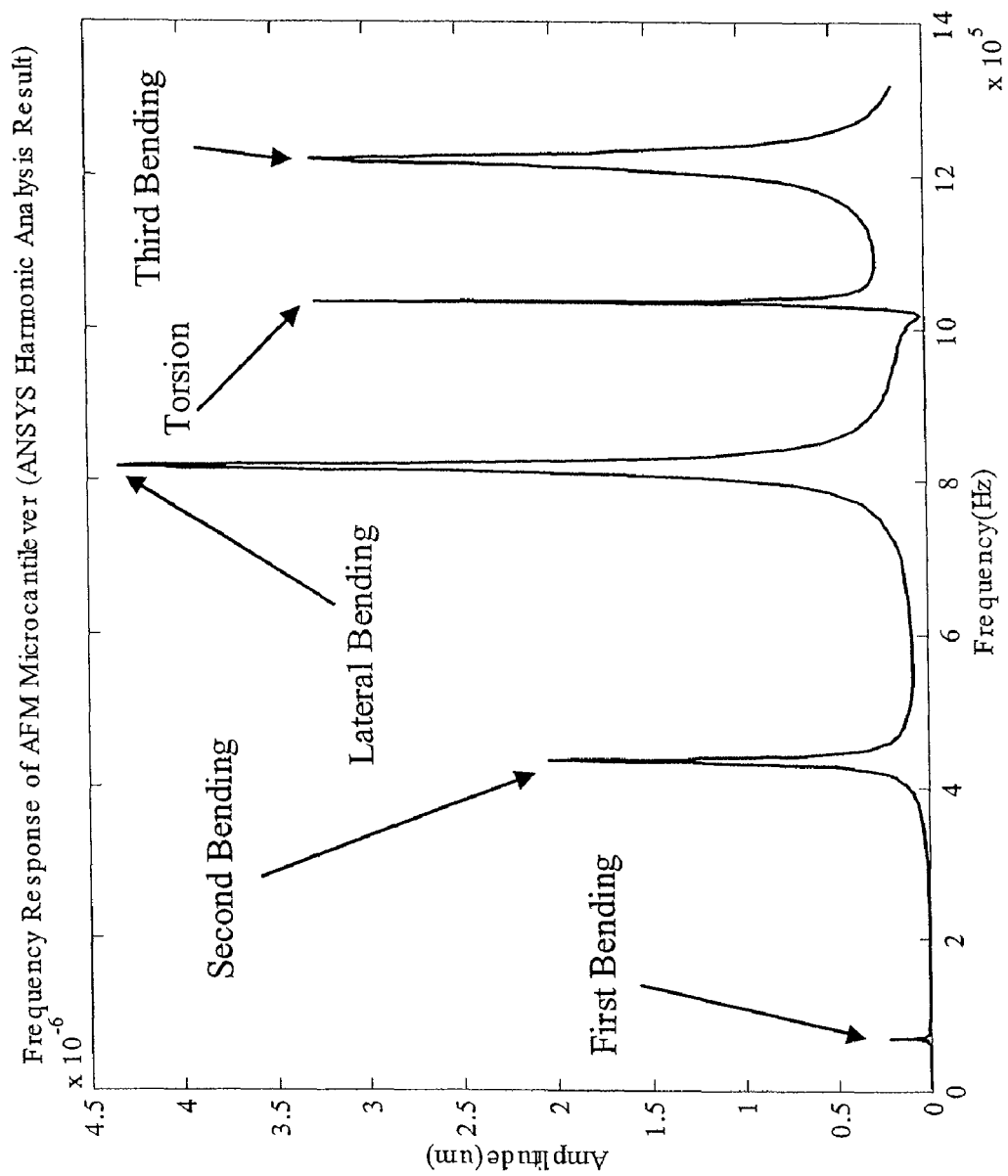
FIG. 20 is a graph illustrating a range of different resonant frequencies at which the instruments of the preferred embodiments may be operated.

Note that in the above discussion of torsional oscillation and feedback, the same device and method can oscillate the cantilever at a lateral resonant frequency instead of or in addition to a torsional resonance. The torsional resonance is preferred because it typically generates less motion at about the tip than lateral resonance, thus allowing higher resolution images. Choosing a lateral resonance instead of a torsional resonance is done by simply selecting the correct frequency for a given cantilever geometry, using standard vibration modal analysis and/or harmonic analysis techniques. FIG. 20 shows a spectrum calculated using ANSYS for a cantilever 225 um long, 30 um wide, identifying the flexural, torsional and lateral resonances. To enable lateral resonance operation instead of torsional resonance, it is simply necessary to choose an oscillation frequency corresponding to a lateral resonance. In FIG. 20, torsional resonance operation would occur at just over 1 MHz, and lateral resonance at around 800 kHz. For the sake of simplicity in the specification, we have confined most of the previous discussion to torsional resonance, but it is understood that the same apparatus and method applies to an oscillation at a lateral resonance.

Current Detection

Figure 9:
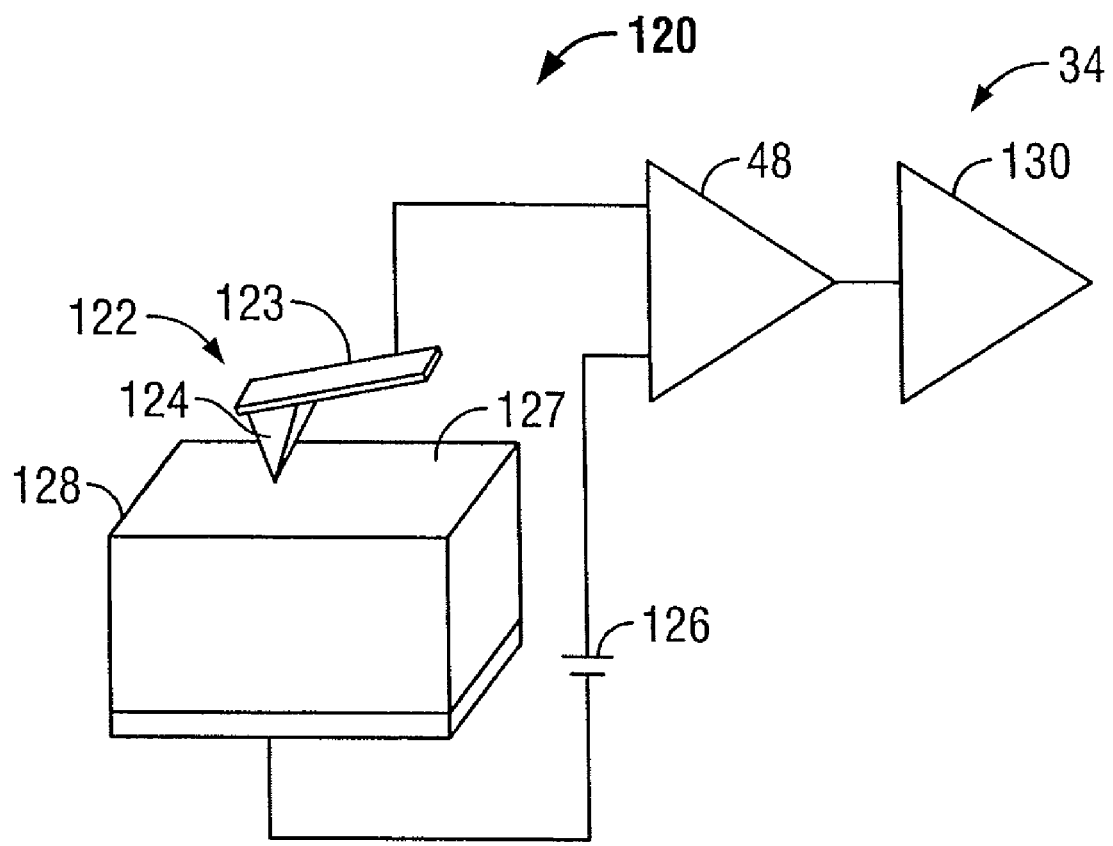
FIG. 9 is a simplified schematic diagram of the current detection apparatus of the preferred embodiment.

Next, as shown in FIG. 9, a current detection scheme 120 associated with an exemplary electrical property detector 34 is shown. An AFM probe assembly including a conductive probe 122 is provided to allow current to flow between the probe and a sample 127. Probe 122, and particularly a cantilever 123 of probe 122, is ideally more stiff than a conventional contact mode AFM probe to allow imaging in the near-filed at a tip-sample separated of about a few nanometers (flexural spring constants of about 1 to 40 N/m). Conductive probe 122 is electrically coupled to pA-amplifier 48, which is a low noise component particularly adapted for the type of small scale currents being measured in the preferred applications. Amplifier 48 generates a current output signal that is electrically coupled, preferably, to an extra gain and filter stage 130.

In operation, a DC bias voltage +/−12V, typically, is applied between probe 122 and sample 127 via a source 126. A measurement current flows between the conductive tip 124 and, for example, a thin dielectric film 128 that resides on the surface of sample 127. During operation, current is measured by pA-amplifier 48 and processed by gain/filter stage 130 prior to being transmitted to an analog-to-digital converter 132 where the current data can thereafter be collected and/or displayed for the user. Gain/filter stage 130 preferably provides a gain of at least 1 pA/V, with noise less than about 30 fA RMS. Notably, unlike amplitude oscillation mode, the resonant frequencies of operation in torsional resonance mode are smaller, thus facilitating ready current detection with pA-amplifier 48, as suggested above.

Figure 10:
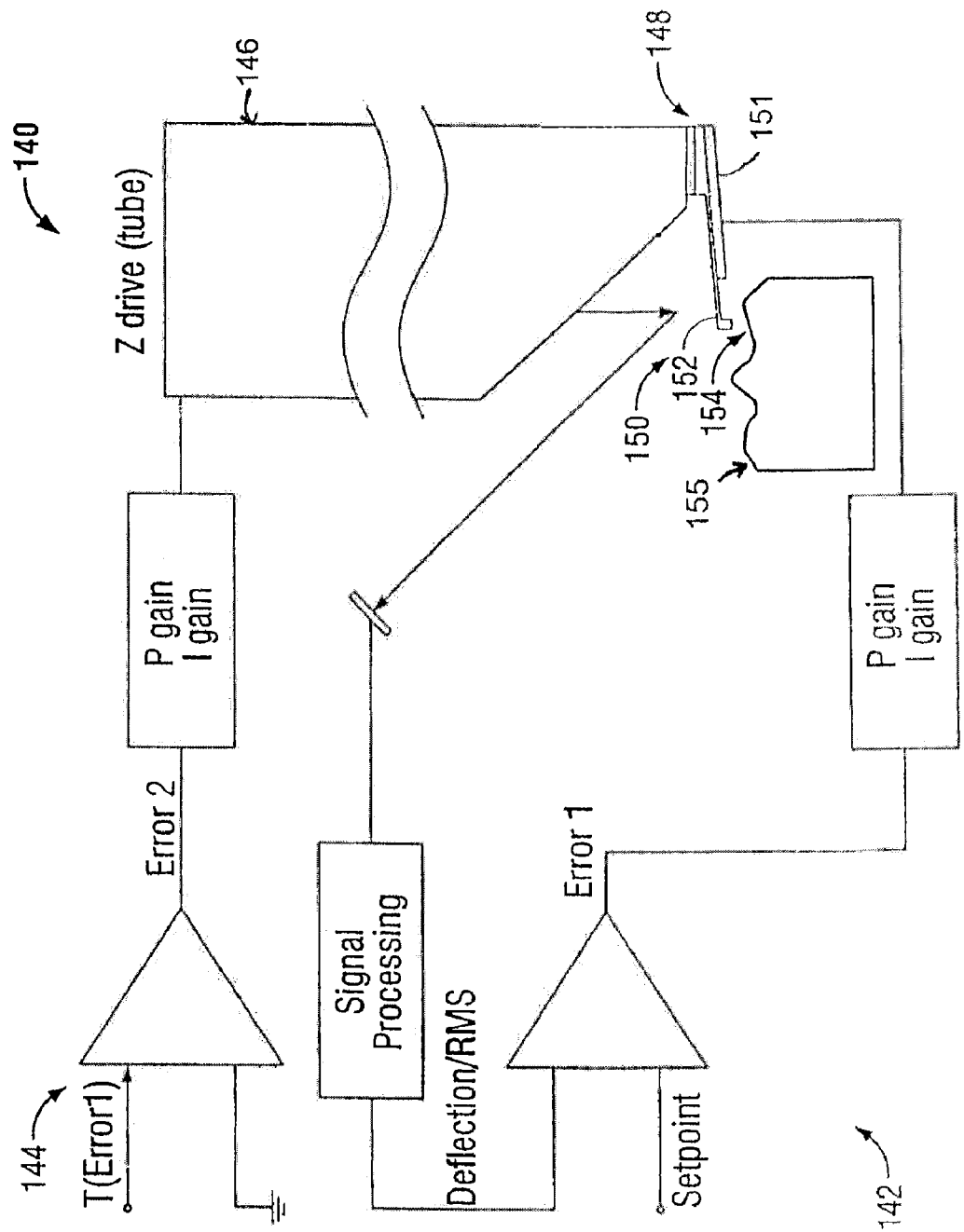
FIG. 10 is a simplified schematic diagram of an AFM according to the preferred embodiment including an active cantilever and nested feedback controller.

In one preferred embodiment, the apparatus shown in FIG. 9 is incorporated into the torsional resonance mode AFM 50 shown in FIG. 6. Alternatively, the current detection scheme 120 shown in FIG. 9 can be incorporated into an AFM 140 including a fast response (i.e., active or self-actuating) probe and a nested feedback controller circuitry, as shown in FIG. 10. Referring more specifically to FIG. 10, AFM 140 includes two feedback loops 142 and 144 that control an AFM Z-position actuator 146 and a probe assembly 148, respectively. Probe assembly 148 includes a base and a self-actuating probe 150 defining a cantilever 152 supporting a tip 154, tip 154 interacting with a sample 155 during scanning.

While it scans the surface of the sample, probe 150 responds to the output of feedback loop 142 to ultimately map the topography of the surface of the sample. To operate at maximum scanning rate, the gain of second feedback loop 144 which controls Z-position actuator 146, is reduced to zero or some small value. As a result, at a scanning rate greater than about 500 microns/sec, the topography of the sample surface appears as the feedback control signal applied to self-actuating probe 150 by first feedback loop 142. In this case, Z position actuator 146 may be controlled, for instance, in a pre-programmed manner to follow the slope of sample surface or to eliminate coupling due to the lateral scanning of tip 154. For a detailed description of active probe technology, see, e.g., U.S. Pat. Nos. 6,189,374 and 6,530,266, owned by the present assignee.

In this embodiment, for quick Z response, the position of the torsional oscillating cantilever is controlled by a fast Z actuator 151 of self actuating probe 150. Fast Z actuator 151 may comprise a zinc oxide layer, for instance, and is operable to move the sensing cantilever up and down at high bandwidth. As understood in the art, piezoelectric Z tube 146 can change the tip-sample separation (in this case by moving probe 150) a larger distance than actuator 151, but at lower bandwidth. Torsional response is driven by the same actuator of the active probe 150. By making the probe conductive, a DC bias voltage can be applied between the tip and the sample surface so that current can be measured as described previously.

TR-TUNA Probe

Figure 11:
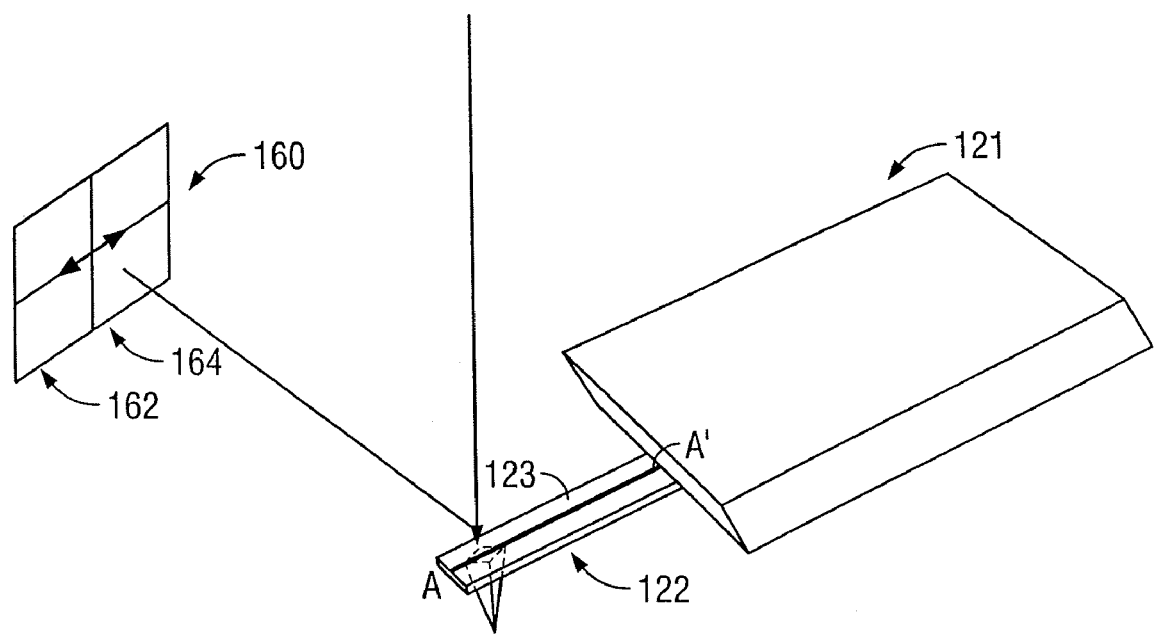
FIG. 11 is an illustration of a probe operable in torsional resonance mode.

The desired torsional motion of the probe 122 is shown in further detail in FIG. 11. Probe assembly 121 is driven to cause rotation of cantilever 123, and hence probe 122 as a whole, about a longitudinal axis A-A' of cantilever 123. Notably, the angular change near the free end of cantilever 123 is the integral of rotation along the length of the cantilever. This change is measured as the difference between the left and right sections 162, 164, respectively, of a quadrant photodetector 160. Because the rotation arm lies in the width direction of the probe 122, the angular change detected by photodetector 160 is significantly greater than when operating in a flexural mode. The result is higher conversion efficiency from cantilever motion to generation of the photodetector signal, and ultimately, control of cantilever oscillation. Again, probes used in torsional resonance mode can be more stiff and thus allow the AFM to maintain a tip-sample distance in the nanometer range in the near field. Such probes are typically made of Si having a conductive coating on the tip side, and have spring constants ranging from about 1 to 40 N/m, as noted previously. Moreover, because the tip remains in the near field with minimal force on the sample, electrical properties/characteristics of a more broad range of samples, including those having an elastic modulus less than about 1 GPa, can be measured. In the end, the shear forces generated between the tip and sample are in a range of about 30 pN and preferably about less than about 1 nN. And, as a result, in direct contrast to prior systems, the sample does not need to be fixedly clamped to the sample support. In fact, the sample need only be bound to a surface with a force approximately less than a chemical bounding force between the two, i.e., a normal force in a range dictated generally by the amount of physical absorption or Van der Waals forces which exist naturally between all the surfaces.

In operation, the detected lateral signal (e.g., sensed via quadrant photodetector 160) is conditioned by signal processor 40 (see, for instance, FIG. 6). Again, the signal processor 40 generates a signal that can be compared to a set-point to generate an error, as described previously. The error is then used to correct the Z position through a proportional-integral feedback loop that generates an appropriate control signal. The control signal is applied to the Z actuator (for example, the Z-section of. the XYZ scanner 58 in FIG. 6) to return the probe torsional resonance RMS to the set point.

Figure 12:
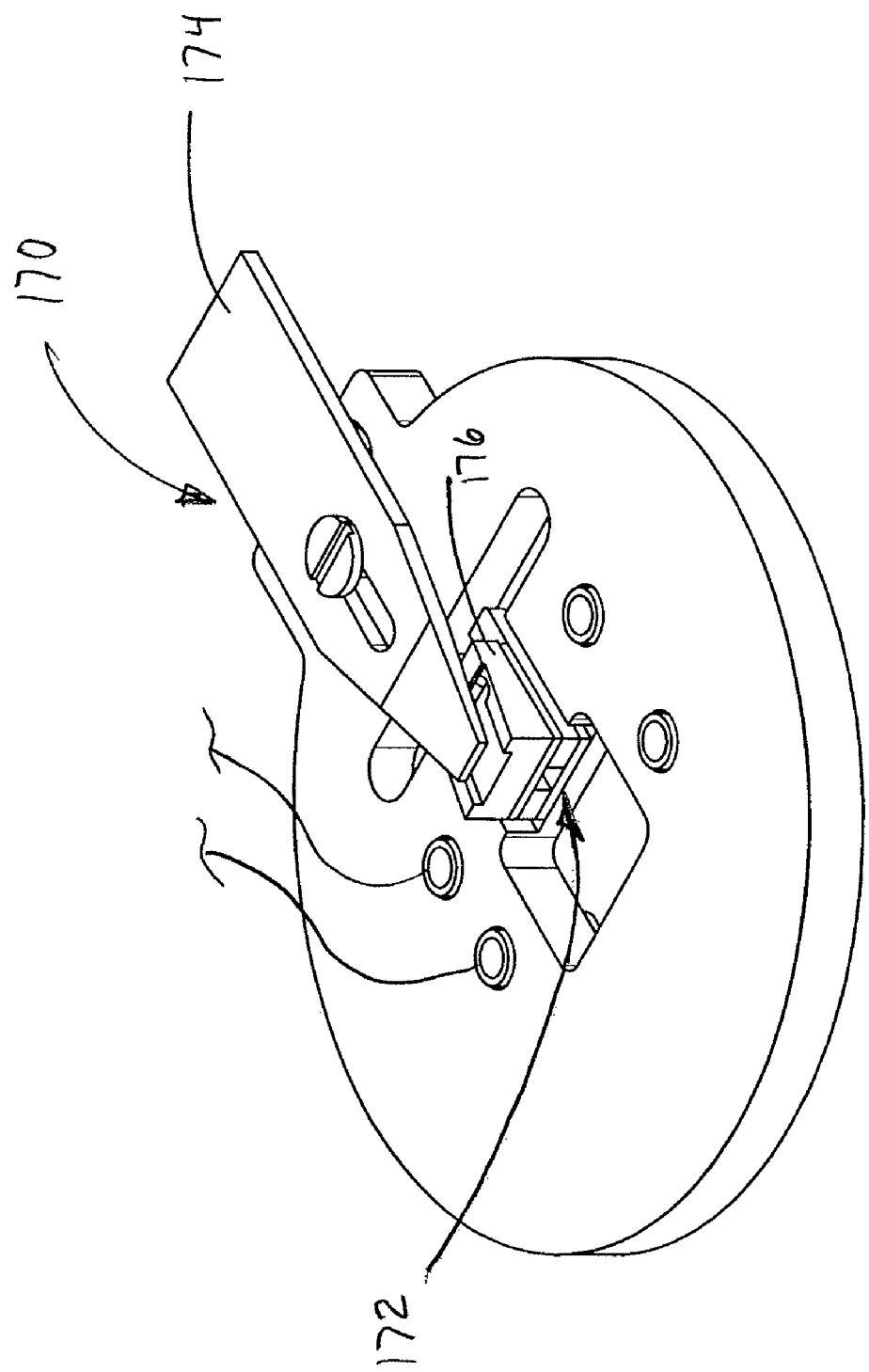
FIG. 12 is a perspective view of a shielded probe holder used in the preferred embodiment.

Turning to FIG. 12, a TR mode electrical property cantilever holder 170 is provided. Holder 170 passivates the probe to shield the electrical measurements being made by the tip on the sample (not shown in FIG. 12) from the scanner (Z piezoelectric actuator). Notably, the means 172 for driving the probe into torsional resonance, two piezoelectric elements driven out of phase for instance, is mounted to the shielded cantilever holder. A conducting spring clip 174 holding the probe chip (not shown) in a chip mount 176 is typically also provided to make the required electrical contact.

TR-SCM

Another electrical parameter associated with samples that can be measured with a probe-based instrument is capacitance. In this embodiment, the advantages of torsional resonance mode are taken advantage in scanning capacitance microscopy (SCM) to characterize selected electrical properties of samples.

In typical SCM, a nano-scale conducting tip is scanned across a sample surface, and a capacitance detector measures variations in the probe-sample capacitance C. Although having a variety of applications, one of the most common uses for SCM is semiconductor characterization, including dopant profiling, device characterization, and surface defect characterization. SCM can show carrier concentration profiles in two dimensions in existing semiconductor devices as well as the relationship of these profiles to critical device structures. The capacitance variation or gradient (dC/dV) provides a measure of the local carrier concentration density and carrier type (n or p), and thus can be used for high-resolution two-dimensional carrier (i.e., dopant) profiling. SCM is particularly useful for this task given that it provides spatial resolution in a range of about 10-20 nm.

More specifically, a metalized probe forms a metal-insulator-semiconductor (MIS) capacitor with the semiconductor sample. An AC bias applied between a scanning contact AFM tip and the sample generates capacitance variations, preferably measured using a gigahertz resonant capacitance sensor, providing sensitivity to variations in the attofarad range. Notably, the measured capacitance most often requires consideration of three capacitive contributions in series, the capacitance of the air in the vicinity of tip, the capacitance of an oxide layer on the sample, and the capacitance of the sample in the vicinity of tip and therefore must be deconvolved.

In addition to imaging, SCM can be used to produce dC/dV versus V curves, i.e., to illustrate the gradient as a function of bias voltage across the lateral scan path on the sample. In this case, typically, a DC sample bias can be ramped between two user-selected values while dC/dV (i.e., sensor output) is monitored and plotted. When used in semiconductor applications, dopant types are revealed by the sign of the signal while dopant levels are indicated by intensity of the signal.

Overall, conventional SCM has advantages in these applications, but given that SCM is normally operated in contact mode, it is often not particularly useful when the user wishes to image electrical properties of more delicate samples and with very high resolution (e.g., nanometer). In the present embodiment, a TR-SCM system is provided so that, rather than operating in contact mode, the probe is oscillated in the lower force torsional resonance mode. TR-SCM thus provides improved ability to electrically characterize delicate samples by insuring that tip-sample forces are maintained at less than 50 nN, for example. In doing so, SCM measurements are realized on the nano-scale.

Figure 13:
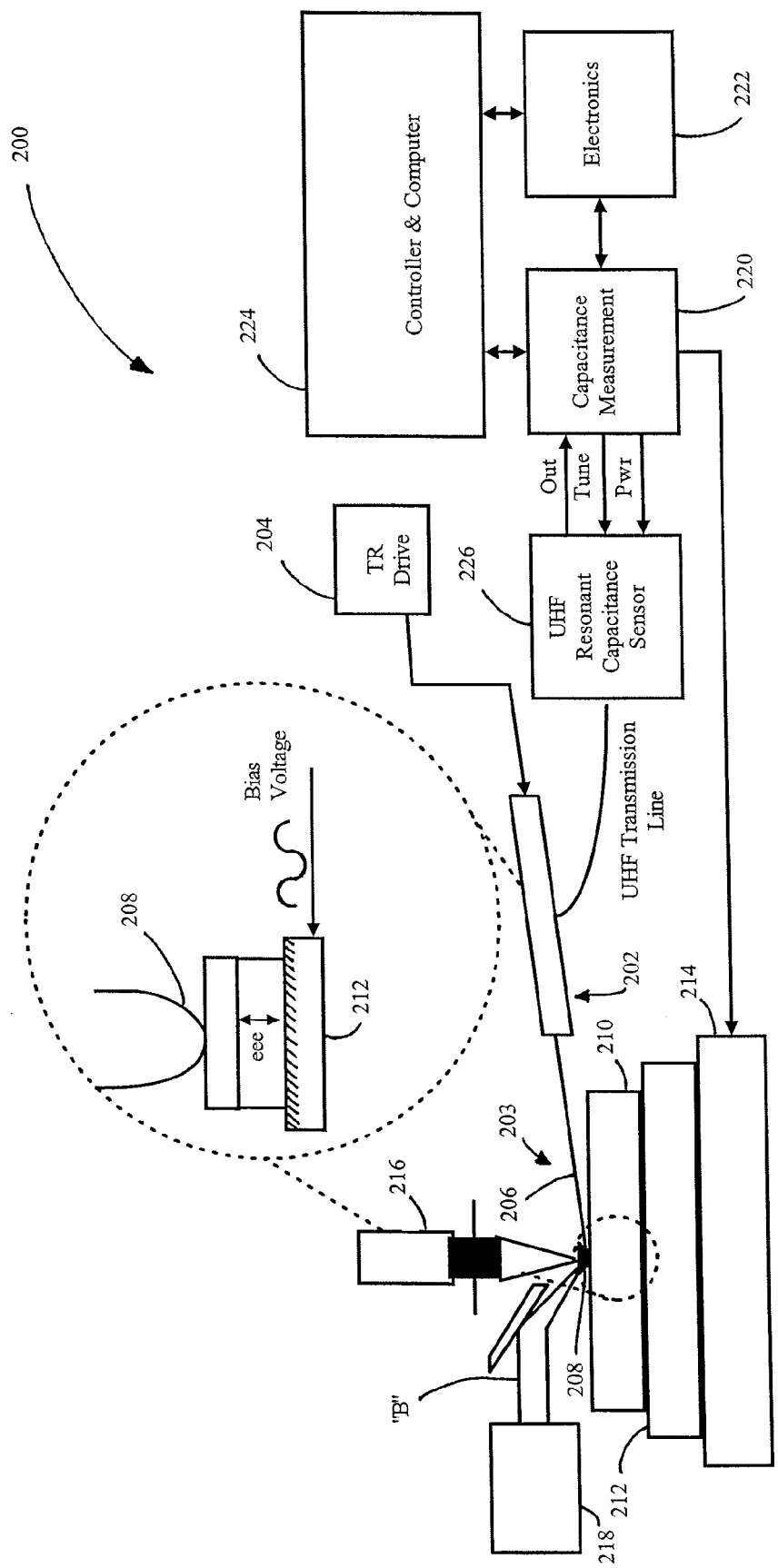
FIG. 13 is a schematic diagram of a TR-SCM according to a preferred embodiment.

Turning to FIG. 13, a TR-SCM 200 is shown. TR-SCM 200 includes a probe assembly 202 driven by a TR drive source 204 to oscillate an electrically conductive probe 203 of assembly 202 at a torsional resonance thereof. Probe 203 includes a cantilever 206 supporting a tip 208 that interacts with sample 210 under test. Sample 210 resides on a chuck 212 mounted on an XY stage 214, for instance, for scanning the sample. To measure torsional oscillation, a laser 216 is directed at a backside of lever 206 and the reflected beam is directed toward a photodetector 218 in conventional fashion.

To effectuate SCM, an AC sample bias voltage generated by a capacitance measurement block 220 is applied to chuck (i.e., a conductor) 212 (see inset, also showing an insulator-sample (e.g., silicon) interface). Block 220 is in communication with an electronics block 222 of the SPM head and each is in communication with the SPM controller and computer 224. Block 220 is also in communication with a UHF resonant capacitance sensor 226 to provide power to the sensor, tune the sensor and otherwise communicate data to system controller/computer 224. Preferably, as shown in FIG. 13, capacitance sensor 226 is coupled to electrically conductive probe 203 via a UHF transmission line.

Generally, UHF electrical resonant capacitance sensor 226 provides the basis of this detection. The electrical resonator is connected to a conductive SPM probe via a transmission line, as shown. When the resonating probe tip is put in contact with a semiconductor, for instance, the sensor, transmission line, probe and sample all become part of the resonator. As a result, tip-sample capacitance variations will load the end, to the transmission line and change the resonant frequency of the system. As known, small changes in resonant frequency create enormous changes in the amplitude of resonance as measured in volts. This system has been shown to be sensitive to variations as small as attofarads ($10^{-18}$ farads).

In operation, SCM induces the desired capacitance variations in the sample near the tip by applying an electric field between the scanning contact AFM tip and the sample. Preferably, this is accomplished using a kilohertz AC bias voltage applied to the semiconductor. The free carriers beneath the tip are alternately attracted and repulsed by the tip due to the alternating electric field. The alternating depletion and accumulation of charges under the tip may be modeled as a moving capacitor plate. The scanning capacitance microscope measures the movement of charges including carriers in semiconductor samples, which translates into a stronger signal for low carrier concentration and/or with samples having a layer of thin oxide.

Images

Several images obtained using the preferred embodiments are shown in FIGS. 14A & B to 19, with some images illustrating comparisons with known techniques such as oscillation mode. Initially, FIGS. 14A and 14B were generated by scanning a thermal plastic polymer sample filled with carbon black. The FIG. 14A image was obtained using oscillation mode feedback with a bias voltage applied between the tip and the sample surface. As one skilled in the art will notice, no current contrast exists in the FIG. 14A image. FIG. 14B, on the other hand, was obtained using torsional resonance mode to control AFM operation. With the same positive bias voltage, the conductive areas associated with the carbon black are readily observed. Note that the current images shown herein indicate positive current in the bright areas, and negative current in the dark areas.

Figures 16A, 16B:
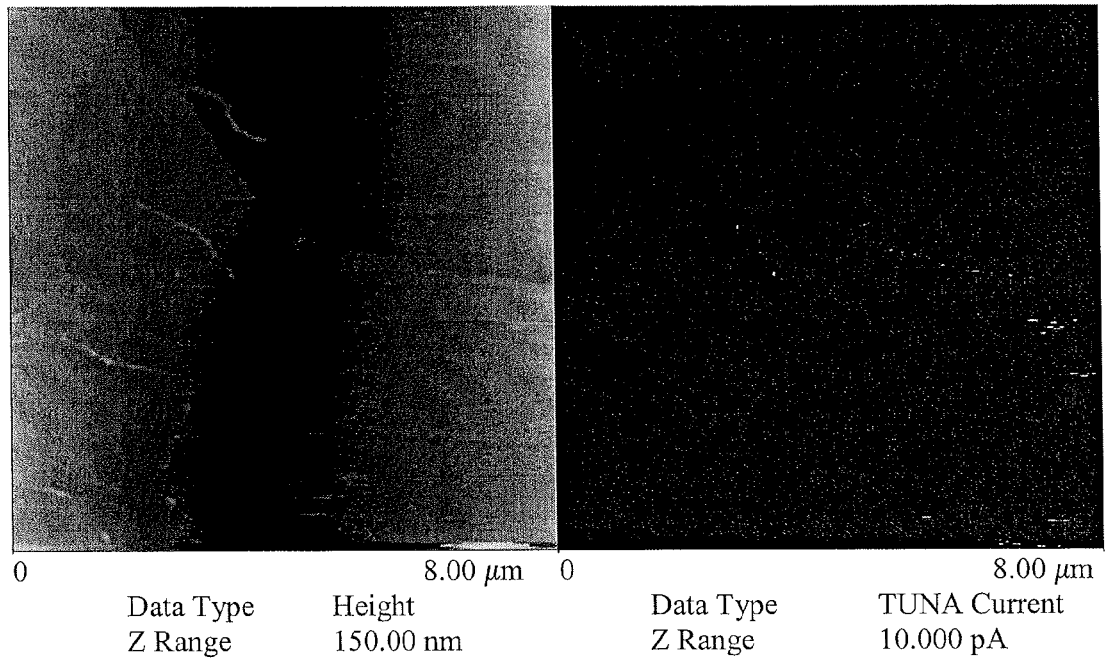
FIGS. 16A and 16B are images similar to FIGS. 15A and 15B, with a negative bias applied, when imaging carbon nanotubes on a HOPG surface.
Figures 17A, 17B:
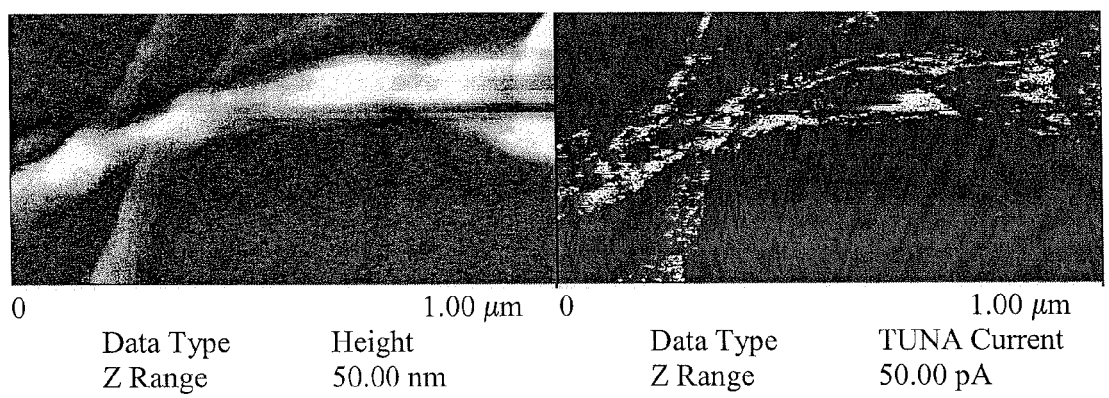
FIGS. 17A and 17B are topography and tunneling current distribution (using a positive bias) images, respectively, of carbon nanotubes on a HOPG surface.

Turning to FIGS. 15A & 15B, the same sample was used as in FIGS. 14A & 14B, but a negative bias was applied. FIG. 15A is a topography image obtained using TR mode feedback. FIG. 15B is a current distribution image, where the dark areas readily indicate negative current. FIGS. 16A & 16B illustrate similar topography and current distribution images, but of a sample comprising carbon nanotubes on a HOPG (graphite) surface, using a negative bias. FIGS. 17A & 17B also illustrate topography and current distribution images, respectively, of carbon nanotubes on a HOPG surface, but applying a positive bias between the tip and the sample. In each case, current contrast can be readily observed when using TR mode feedback.

Figure 18:
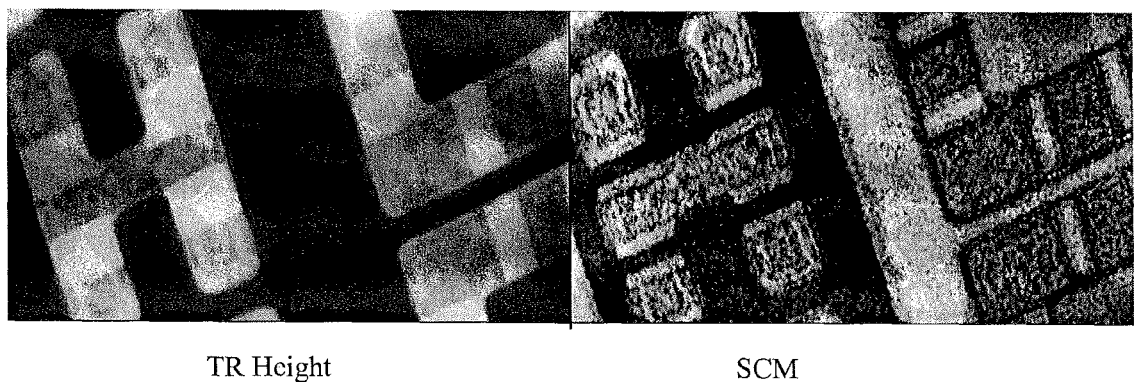
FIG. 18 is a TR topography (left) and a TR-SCM (right) image of a semiconductor (SRAM) sample.
Figure 19:
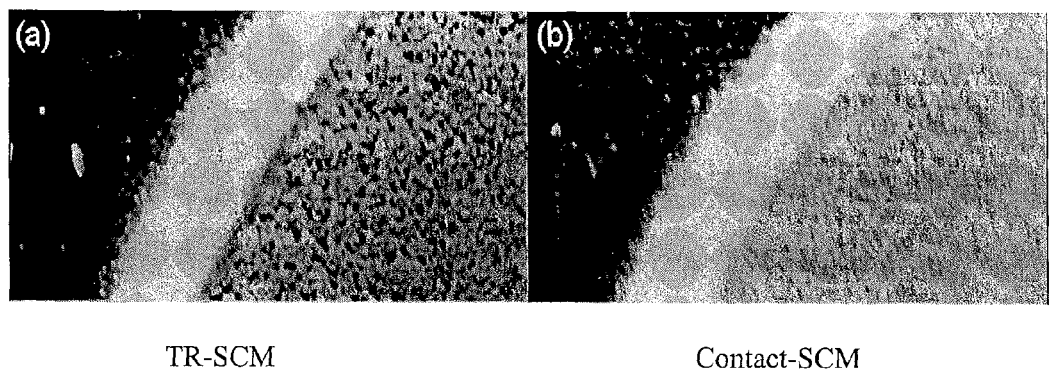
FIG. 19 includes comparison images between TR-SCM (left) and Contact-SCM (right)

Finally, TR-SCM images are shown in FIGS. 18 and 19. FIG. 18 illustrates TR height (left) and SCM data on a semiconductor sample (SRAM, 20 microns) using a NSIV (thermal calibration), a conventional SPM head and an external lock-in amplifier. FIG. 19 illustrates the differences between TR-SCM and Contact-SCM when characterizing a GaN film (30 um), showing superior image contrast in the TR-SCM data obtained without an oxide coated tip.

Notably, an additional advantage of the preferred embodiments over known electrical characterization techniques such as STM is that tunneling current, as that term is understood in the art, is not required to perform the electrical measurements due to the fact that current feedback is not used. In this regard, three kinds of emissions between the probe and sample can possibly be observed including tunneling, Shottky emission and field emission. As a result, the term "current measurement", and others like it, are used herein to refer to detection of any such current, not simply tunneling current.

The preferred embodiments are useful in a variety of applications and for electrical characterization of samples that were heretofore difficult to characterize. For instance, organic conductors and conducting polymers, which make up a litany of emerging devices, as well as soft polymers, can now readily be characterized. In addition, DNA deposited on conductors, gold films and carbon nanotubes, as well as nanowires made of nitrites, silicon, germanium, etc., which classically could not be electrically characterized with standard contact mode techniques can now be readily measured. This is primarily due to the fact that the preferred embodiments, unlike techniques that utilize contact mode and its relatively shear forces, can measure samples either loosely bound to a substrate or easily broken (e.g., DNA). Again, both current distribution over an entire sample surface, or a portion thereof, as well as spectroscopic force measurements (even on the nanometer scale) can be readily accomplished over a wide range of samples.

Although the best mode contemplated by the inventors of carrying out the present invention is disclosed above, practice of the present invention is not limited thereto. For example, the sample may be subjected to alternate environments (e.g., varied media, atmospheric conditions, etc.), and the corresponding torsional mode response analyzed. Notably, such alterations may change oscillation properties of the probe as desired by the user. It will be manifest that various additions, modifications and rearrangements of the features of the present invention may be made without deviating from the spirit and scope of the underlying inventive concept.

What is claimed is:

1. An apparatus for measuring a sample comprising:
a probe holder supporting a probe having a tip extending substantially orthogonally to the sample;
a torsional resonance mode actuator that couples energy to said probe to oscillate said probe at a torsional resonance thereof;
a conductor, wherein said conductor is in electrical communication with said probe;
an electrical property measuring detector for measuring an electrical property of the sample, wherein the sample is disposed between said probe and said conductor; and
a feedback loop that operates to maintain a probe-sample separation less than about 10 nm based on changes in the torsional oscillation of the probe.

2. The apparatus of claim 1, wherein the electrical property is a current.

3. The apparatus of claim 1, wherein the electrical property is a capacitance.

4. The apparatus of claim 1, wherein the electrical property is in the frequency range of an electromagnetic field from DC to Tera Hz.

5. The apparatus of claim 1, wherein the electrical property is based on optical spectroscopy of local electromagnetic polarization.

6. The apparatus of claim 1, wherein the probe-sample separation is less than about 5 nm.

7. The apparatus of claim 1, wherein the sample has an elastic modulus less than about 1 GPa.

8. The apparatus of claim 1, wherein the probe holder is shielded.

9. The apparatus of claim 1, wherein the sample is bound to a surface with a force approximately less than a chemical bounding force between the two.

10. The apparatus of claim 1, wherein the torsional resonance is between about 1 kHz and 10 GHz.

11. The apparatus of claim 1, wherein the probe is conductive and a DC bias voltage is applied between the probe and the sample.

12. The apparatus of claim 11, wherein a current flowing between the probe and the sample is less than about 500 pA.

13. The apparatus of claim 12, wherein the current is between about 60 fA and 120 pA.

14. The apparatus of claim 1, wherein a stiffness of the probe is between about 0.1 to 1000 N/m.

15. The apparatus of claim 14, wherein the stiffness is between 1 to 40 N/m.

16. The apparatus of claim 1, wherein the probe is a self-actuated probe having a cantilever including an active element.

17. The apparatus of claim 1, wherein the sample is one of a group including a conducting polymer, an organic LED, a biomolecule, a carbon nanotube, a nanowire, a semiconductor, and a biological cell.

* * * * *